(12) United States Patent
Huo et al.

(10) Patent No.: US 12,259,623 B2
(45) Date of Patent: Mar. 25, 2025

(54) ARRAY SUBSTRATE AND DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Peirong Huo, Beijing (CN); Chao Liang, Beijing (CN); Peng Liu, Beijing (CN); Jingyi Xu, Beijing (CN); Bo Li, Beijing (CN); Zhenhong Xiao, Beijing (CN)

(73) Assignees: Ordos Yuansheng Optoelectronics Co., Ltd., Inner Mongolia (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/028,523

(22) PCT Filed: Mar. 31, 2022

(86) PCT No.: PCT/CN2022/084245
§ 371 (c)(1),
(2) Date: Mar. 25, 2023

(87) PCT Pub. No.: WO2023/184292
PCT Pub. Date: Oct. 5, 2023

(65) Prior Publication Data
US 2024/0353720 A1 Oct. 24, 2024

(51) Int. Cl.
*G02F 1/1362* (2006.01)

(52) U.S. Cl.
CPC .. *G02F 1/136286* (2013.01); *G02F 1/136218* (2021.01)

(58) Field of Classification Search
CPC ......... G02F 1/136286; G02F 1/136218; G02F 1/136204; G02F 1/1362; G02F 1/13394; G02F 1/1339; G02F 1/1345; G02F 1/13454; G09G 5/003; G09G 3/3208; G09G 3/3648; G09G 3/3677
See application file for complete search history.

(56) References Cited

U.S. PATENT DOCUMENTS

| | | | | |
|---|---|---|---|---|
| 2010/0045920 | A1* | 2/2010 | Kwak | G02F 1/13394 349/149 |
| 2013/0076716 | A1* | 3/2013 | Lim | G09G 3/3696 345/87 |
| 2015/0303616 | A1 | 10/2015 | Yagi et al. | |
| 2019/0005915 | A1* | 1/2019 | Liu | G02F 1/136286 |

FOREIGN PATENT DOCUMENTS

| | | | | |
|---|---|---|---|---|
| CN | 104203111 | A | 12/2014 | |
| CN | 108630162 | A * | 10/2018 | |
| CN | 110913570 | A | 3/2020 | |
| CN | 110930927 | A * | 3/2020 | ............... G09G 3/20 |
| CN | 112150953 | A * | 12/2020 | ......... G02F 1/13338 |
| CN | 213401742 | U | 6/2021 | |
| CN | 114005862 | A | 2/2022 | |
| CN | 215813622 | U * | 2/2022 | |

* cited by examiner

Primary Examiner — Hoan C Nguyen
(74) Attorney, Agent, or Firm — Ling Wu; Stephen Yang; Ling and Yang Intellectual Property

(57) ABSTRACT

An includes a display area and a non-display area that at least partially surrounds the display area; the non-display area includes at least two clock signal lines, wherein a ratio of a spacing between two adjacent clock signal lines to a line width of the clock signal lines is greater than or equal to 3.

19 Claims, 10 Drawing Sheets

ARRAY SUBSTRATE AND DISPLAY DEVICE

CROSS-REFERENCE TO RELATED APPLICATION

This application is a national stage application of PCT Application No. PCT/CN2022/084245, which is filed on Mar. 31, 2022 and entitled "Array Substrate and Display Device", the content of which should be regarded as being incorporated herein by reference.

TECHNICAL FIELD

Embodiments of the present disclosure relate to, but are not limited to, the field of display technologies, and particularly to an array substrate and a display device.

BACKGROUND

Liquid Crystal Display (LCD) has advantages such as small size, low power consumption and no radiation, and has developed rapidly. More and more industrial fields (such as automotive field) have more and more strict requirements for electromagnetic compatibility of liquid crystal display products. However, some liquid crystal display products are prone to electromagnetic interference between signal lines, which affects the normal work of the products.

SUMMARY

The following is a summary of subject matters described herein in detail. The summary is not intended to limit the protection scope of claims.

In one aspect, an embodiment of the present disclosure provides an array substrate including: a display area and a non-display area that at least partially surrounds the display area; wherein the non-display area includes at least two clock signal lines, a ratio of a spacing between two adjacent clock signal lines to a line width of the clock signal lines is greater than or equal to 3.

In another aspect, an embodiment of the present disclosure further provides a display device including the array substrate in the aforementioned embodiment.

Other characteristics and advantages of the present disclosure will be set forth in the following specification, and moreover, partially become apparent from the specification or are understood by implementing the present disclosure. Other advantages of the present disclosure may be achieved and obtained through solutions described in the specification and drawings.

Other aspects may be understood upon reading and understanding the drawings and the detailed description.

BRIEF DESCRIPTION OF DRAWINGS

The drawings are used for providing understanding of technical solutions of the present disclosure, constitute a part of the specification, and together with the embodiments of the present disclosure, are used for explaining the technical solutions of the present disclosure but do not form limitations on the technical solutions of the present disclosure. Shapes and sizes of each component in the drawings do not reflect actual scales, and are only intended to schematically illustrate contents of the present disclosure.

DETAILED DESCRIPTION

Figure 1:
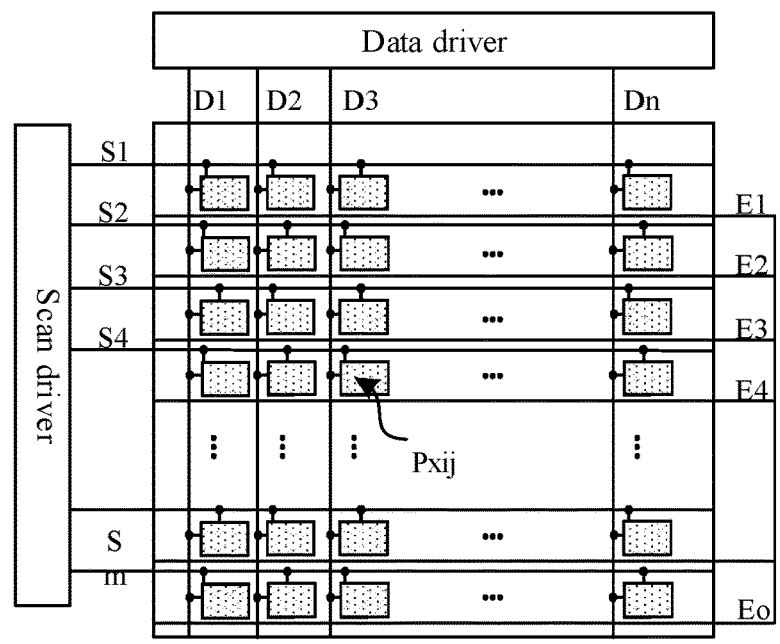
FIG. 1 is a schematic diagram of a structure of an array substrate.

The embodiments of the present disclosure will be described in detail below with reference to the drawings. It is to be noted that implementation modes may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

Scales of the drawings in the present disclosure may be used as a reference in the actual process, but are not limited thereto. For example, the width-length ratio of the channel, the thickness and spacing of each film layer, and the like may be adjusted according to actual needs. For example, in the drawings, a dimension of each constituent element, a thickness of a layer, or an area is exaggerated sometimes for clarity. Therefore, an implementation of the present disclosure is not necessarily limited to the size shown, and a shape and size of each component in the drawings do not reflect true proportions. In addition, the drawings schematically illustrate ideal examples, and one implementation of the present disclosure is not limited to the shapes, numerical values, or the like shown in the drawings.

The "first", "second", "third" and other ordinal numbers in the exemplary embodiments of the present disclosure are used to avoid confusion of constituent elements, not to provide any quantitative limitation.

In the exemplary embodiments of the present disclosure, for the sake of convenience, wordings such as "central", "upper", "lower", "front", "rear", "vertical", "horizontal", "top", "bottom", "inner", "outer" and the others describing the orientations or positional relations are used to depict the relationship of constituent elements with reference to the drawings, which are only for an easy and simplified description of the present disclosure, rather than for indicating or implying that the device or element referred to must have a specific orientation, or must be constructed and operated in a particular orientation and therefore, those wordings cannot be construed as limitations on the present disclosure. The positional relationships between the constituent elements may be changed as appropriate according to a direction which is used for describing each constituent element. Therefore, appropriate replacements may be made according to situations without being limited to the wordings described in the specification.

In the exemplary embodiments of the present disclosure, the terms "install", "connect" and "couple" shall be broadly understood unless otherwise explicitly specified and defined. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the exemplary embodiments of the present disclosure, "an electrical connection" includes a case where constituent elements are connected via an element having a certain electrical action. The "element with the certain electrical effect" is not particularly limited as long as electrical signals may be sent and received between the connected constituent elements. For example, "the element with the certain electrical effect" may be an electrode or wiring, or a switch element, such as a transistor, or other functional elements, such as a resistor, an inductor, a capacitor, or the like.

In exemplary embodiments of the present disclosure, transistor refers to an element that at least includes three terminals, i.e., a gate electrode (gate or control electrode), a drain electrode (drain electrode terminal, drain area, or drain), and a source electrode (source electrode terminal, source area, or source). A transistor has a channel area between a drain electrode and a source electrode, and a current can flow through the drain electrode, the channel area, and the source electrode. It is to be noted that, in the specification, the channel region refers to a region through which the current mainly flows.

In exemplary embodiments of the present disclosure, in order to distinguish two electrodes of a transistor other than a gate electrode (gate electrode or control electrode), one of the two electrodes is directly described as a first electrode, while the other is described as a second electrode. The first electrode may be a drain electrode, and the second electrode may be a source electrode. Or, the first electrode may be a source electrode, and the second electrode may be a drain electrode. In cases that transistors with opposite polarities are used, a current direction changes during operation of a circuit, or the like, functions of the "source electrode" and the "drain electrode" may sometimes be interchangeable. Therefore, the "source electrode" and the "drain electrode" are interchangeable in the specification.

Transistors in the embodiments of the present disclosure may be Thin Film Transistors (TFTs), or Field Effect Transistors (FETs), or other devices with same characteristics. For example, a thin film transistor used in the embodiments of the present disclosure may include, but is not limited to, an oxide TFT or a Low Temperature Poly-silicon TFT (LTPS TFT). Here, the embodiment of the present disclosure is not limited to this.

In exemplary embodiments of the present disclosure, triangle, rectangle, trapezoid, pentagon and hexagon are not strictly defined, and they may be approximate triangle, rectangle, trapezoid, pentagon or hexagon, etc. There may be some small deformation caused by tolerance, and there may be chamfer, arc edge and deformation, etc.

In exemplary embodiments of the present disclosure, "parallel" refers to a state in which two straight lines form an angle above −10 degrees and below 10 degrees, and thus also includes a state in which the angle is above −5 degrees and below 5 degrees. In addition, "perpendicular" refers to a state in which an angle formed by two straight lines is above 80° and below 100°, and thus also includes a state in which the angle is above 85° and below 95°.

In exemplary embodiments of the present disclosure, "about" means that there is not strict limit for a value, and values within an error range during processes and measurement are allowed.

In exemplary embodiments of the present disclosure, "being arranged on the same layer" is referred to a structure formed by two (or more) structures formed by the same deposition process and patterned through the same composition process, and their materials may be the same or different. For example, the materials of the precursors forming a plurality of structures arranged in the same layer are the same, and the resulting materials may be the same or different.

In order to facilitate better understanding of technical solutions of the present disclosure by those skilled in the art, technical terms that may be involved in exemplary embodiments of the present disclosure are briefly described below.

Electro Magnetic Compatibility (EMC) refers to the ability of equipment or system to work normally in electromagnetic environment without any unbearable electromagnetic interference to anything in the environment, and it is mainly composed of Electro-Magnetic Interference (EMI) and Electro-Magnetic Susceptibility (EMS). Electro-Magnetic Interference (EMI) is a kind of capability index test corresponding to EMC. Conduction Emission (CE) refers to the electromagnetic interference in the frequency range from 9 kHz (kilohertz) to 30 MHz (megahertz). Radiated Emission (RE) refers to the electromagnetic interference in the frequency range from 30 MHz to 1 GHz (gigahertz). Bulk Current Injection (BCI) is measured from 1 MHz to 400 MHz by injecting RF energy into the wire harness with a current probe, and the parameter may be 300 mA (milliampere). Radiated Immunity (RI) refers to electromagnetic interference from 400 MHz to 2000 MHz. Electrostatic Discharge (ESD) immunity refers to the direct or indirect application of ESD to the object to be tested. For example, the parameters may be set to 32 KV, 150 pF, or 330 pF. Spread Spectrum Clock (SSC) is an efficient and low-cost method to control EMI. SSC may reduce the peak value of EMI by spreading the energy radiated by clock to a wide frequency range. A Gate Driver on Array (GOA) technology refers to a technology of disposing a GOA unit configured to drive a gate line in a non-display area.

With the continuous development of display technology, the application scenarios of LCD products are expanding. Nowadays, with the rapid development of integration technology, LCD products are becoming more and more integrated, miniaturized and networked. Due to the limited space, the signal lines in LCD screens are densely routed. Therefore, in the actual use process, unreasonable wiring structure will easily lead to poor electromagnetic compatibility performance, resulting in lower product yield, which is not conducive to product popularization and application. For example, if the electromagnetic compatibility performance is poor, it would be easy to have problems of poor display, such as flower screen and black screen, caused by frequency band interference of other systems, or the frequency interference of signal lines inside the LCD screen interferes with the normal work of other systems. For example, at present, the mainstream means to solve EMC problem is to turn on the spread spectrum function through a system or chip SSC, to avoid interference in certain frequency bands. However, in the automotive industry or other fields with stricter electromagnetic compatibility requirements, EMC testing is basically full-band. The typical high-frequency signal line in the LCD screen is the high-frequency clock signal line, the frequency of which is generally about 40 kHz, and this frequency band or multiples of this frequency are easily located in the RE/CE frequency band of EMC testing in automobile industry. If the electromagnetic compatibility performance is poor, it is easy for the chip or system to adjust the internal crystal oscillator SSC to be unable to cover, which makes it impossible to pass the EMC capability test commonly used in automobile and electronic industry in the process of product certification, and the product yield would be low. Therefore, it is very important to improve electromagnetic compatibility performance.

FIG. 1 is a schematic diagram of a structure of an array substrate. As shown in FIG. 1, in an exemplary embodiment, the array substrate may include a display area (also called an active area (AA)) and a non-display area, the display area may include a plurality of gate lines (S1 to Sm) and a plurality of data lines (D1 to Dn), wherein the plurality of gate lines may extend along a horizontal direction and be arranged sequentially along a vertical direction, the plurality of data lines may extend along the vertical direction and be arranged sequentially along the horizontal direction, and the plurality of gate lines and the plurality of data lines are intersected with each other to define a plurality of sub-pixels Pxij arranged regularly. Sub-pixel Pxij may refer to a sub-pixel in which a transistor is connected to an ith gate line and a jth data line, where i and j may be natural numbers.

In an exemplary embodiment, at least one sub-pixel Pxij may include a thin film transistor, a pixel electrode and a common electrode, wherein the thin film transistor is connected with a gate line, a data line and a pixel electrode, respectively, where i and j may be natural numbers.

In an exemplary embodiment, the array substrate may further include a plurality of common electrode lines (E1 to Eo), which may extend along the horizontal direction and are sequentially arranged along the vertical direction, and are connected correspondingly with common electrodes in the plurality of sub-pixels Pxij.

In an exemplary embodiment, a plurality of gate lines are led out to the non-display area and connected with a scan driver; a plurality of data lines are led out to the non-display area and connected with a data driver; and at least a portion of the scan driver and the data driver may be formed on the array substrate.

In an exemplary embodiment, an external control device (such as a timing controller) may provide a gray scale value and a control signal suitable for a specification of the data driver to the data driver, and the data driver may utilize the received gray scale value and the control signal to generate a data voltage to be provided to the data lines D1, D2, D3, . . . and Dn. For example, the data driver may sample the grayscale value by using the clock signal and apply a data voltage corresponding to the grayscale value to the data lines D1 to Dn by taking a pixel row as a unit, wherein n may be a natural number. An external control device may provide a clock signal, a scan start signal and the like suitable for a specification of the scan driver to the scan driver, and the scan driver may utilize the clock signal, the scan start signal and the like to generate a scan signal to be provided to the scan signal lines S1, S2, S3, . . . and Sm. For example, the scan driver may provide sequentially a scan signal with a turn-on level pulse to the scan signal lines S1 to Sm, where m may be a nature number. For example, the scanning driver may be constructed in a form of a shift register and may generate the scanning signal by sequentially transmitting the scanning starting signal provided in a form of the on-level pulse to a next-stage circuit under the control of the clock signal.

In an exemplary embodiment of the present disclosure, a first direction DR1 may refer to a vertical direction or an extending direction of a data line in a display area, a second direction DR2 may refer to a horizontal direction or an extending direction of a gate line in the display area, and a third direction DR3 may refer to a thickness direction of the array substrate or a direction perpendicular to a plane of the array substrate, etc. . . . . . The first direction DR1 intersects with the second direction DR2, and the first direction DR1 intersects with the third direction DR3. For example, the first direction DR1 and the second direction DR2 may be perpendicular to each other, and the first direction DR1 and the third direction DR3 may be perpendicular to each other.

An embodiment of the present disclosure provides an array substrate, which may include a display area and a non-display area that at least partially surrounds the display area; the non-display area may include at least two clock signal lines, wherein a ratio of a spacing between two adjacent clock signal lines to a line width of the clock signal lines is greater than or equal to 3. Accordingly, the wiring structure of the clock signal lines may be more reasonable. Therefore, when a clock signal passes through a first clock signal line and a second clock signal line, induction of a signal on adjacent signal lines may be avoided, the crosstalk of the clock signals may also be avoided, and noise interference generated by mutual coupling of electromagnetic fields in the transmission process of clock signals may be eliminated, thereby improving the electromagnetic compatibility performance.

In an exemplary embodiment, a ratio of a spacing between two adjacent clock signal lines to a line width of the clock signal lines may be about 3, 3.25, 3.5, 4, 4.25, 4.5, 4.75, 5, 5.25, 5.5, 5.75, or 6, etc. Of course, other values may also be available, which can be arranged by those skilled in the art depending on a width of the non-display area of the array substrate. Here, the embodiment of the present disclosure is not limited to this.

In an exemplary embodiment, the clock signal line may be an output signal line of a Gate of a thin film transistor, and at least two clock signal lines may be alternately output during GOA step-by-step transmission. For example, the number of the clock signal lines may include, but is not limited to, two, three, or four, depending on the GOA driving mode adopted by the array substrate. Here, the embodiment of the present disclosure is not limited to this.

In an exemplary embodiment, the clock signal lines are high frequency signal lines. For example, a frequency of the high frequency signal lines may be about 35 kHz to 45 kHz. For example, when the array substrate is applied to a display product with a refresh frequency of 60 Hz (Hertz), a pulse width of a pulse wave of the clock signal lines may be about 10 µs (microseconds) and the frequency may be about 43.5 kHz. Here, the embodiment of the present disclosure is not limited to this.

In an exemplary embodiment, the at least two clock signal lines may be sequentially arranged in a direction away from the display area, and each clock signal line at least partially surrounds the display area.

In an exemplary embodiment, the non-display area may further include a ground protection line, wherein the ground protection line may include at least one of a first ground protection line, a second ground protection line and a third ground protection line, the first ground protection line is arranged on a side of at least two clock signal lines close to the display area, the second ground protection line is arranged between two adjacent clock signal lines, and the third ground protection line is arranged on a side of the at least two clock signal lines away from the display area. In this way, ground protection lines are respectively arranged at gaps on both sides of the clock signal line. Therefore, when a high frequency clock signal is transmitted on the clock signal line, a coupled electric field between the lines may be converted into electric field of the respective signal lines to the ground, thereby suppressing crosstalk between the signal lines, reducing the transmission frequency of the signal lines, and effectively improving the electromagnetic compatibility performance. Furthermore, the electromagnetic compatibility performance of the array substrate may be effectively improved without increasing a frame width.

In an exemplary embodiment, the second ground protection line may be arranged between the first ground protection line and the third ground protection line.

In an exemplary embodiment, the first ground protection line, the second ground protection line, and the third ground protection line may be sequentially arranged in a direction away from the display area.

In an exemplary embodiment, the ground protection line has the same shape as the clock signal line. Here, "the same shape" is not strictly meant, and it may mean that the lines are approximately the same, and there may be some small deformation caused by process and tolerance.

In an exemplary embodiment, the ground protection line may include a first ground protection line segment, a second ground protection line segment and a third ground protection line segment which are sequentially connected; the clock signal line may include a first clock signal line segment, a second clock signal line segment and a third clock signal line segment which are sequentially connected; the first ground protection line segment and the first clock signal line segment both extend in a first direction DR1 and are parallel to each other, the second ground protection line segment and the second clock signal line segment both extend in a second direction DR2 and are parallel to each other, and the third ground protection line segment and the third clock signal line segment both extend in the first direction DR1 and are parallel to each other.

In an exemplary embodiment, the number of the ground protection line may be a plurality such that both sides of each clock signal line are arranged with one ground protection line.

In an exemplary embodiment, the clock signal lines and the ground protection lines are arranged on the same layer. In this way, the ground protection lines and the clock signal lines may be formed by a one-time patterning process, which has little improvement on the existing process, neither increases the number of patterning processes nor increases the structural film layer, and has simple preparation process, low production cost and convenient implementation.

In an exemplary embodiment, the display area may include a plurality of data lines, and the clock signal lines, the ground protection lines, and the data lines are arranged on the same layer. Thus, the ground protection lines, the clock signal lines and the data lines are formed by one-time patterning process, which has little improvement on the existing process, neither increases the number of patterning processes nor increases the structural film layer, and has simple preparation process, low production cost and convenient implementation.

In an exemplary embodiment, a ratio between a line width of the ground protection line to a line width of the clock signal line may be about 0.8 to 1.2. For example, the ratio between the line width of the ground protection line to the line width of the clock signal line may be about 0.8, 0.85, 0.9, 0.95, 1.0, 1.05, 1.1, 1.15, or 1.2, etc. Here, the embodiment of the present disclosure is not limited to this.

In an exemplary embodiment, the first ground protection line, the second ground protection line, and the third ground protection line have equal line widths. Here, "equal" is not strictly defined, and values within a range of process and measurement errors are allowed.

In an exemplary embodiment, the non-display area may further include at least one shielding electrode connected to the ground protection line through a via hole. In this way, by arranging the ground protection lines at the gaps on both sides of the clock signal lines and digging holes on an upper insulating layer, the ground signal is connected to an upper shielding electrode, so that the ground lines on both sides of the clock signal line and the upper shielding electrode build a bridge structure, and form a ground plane, which may avoid the formation of a plurality of parallel ground lines, shield the clock signal lines with longer periphery, avoid mutual interference between the clock signal lines, and avoid electromagnetic interference caused by external systems to the clock signal lines, thereby greatly improving electromagnetic compatibility performance without increasing the frame.

In an exemplary embodiment, the display area may include a common electrode, and the shielding electrode and the common electrode are arranged on the same layer. Thus, the shielding electrode and the common electrode may be formed by a one-time patterning process, which has little improvement on the existing process, neither increases the number of patterning processes nor increases the structural film layer, and has simple preparation process, low production cost and convenient implementation.

In an exemplary embodiment, the shielding electrode is arranged on a different layer from the ground protection line and on a different layer from the clock signal line; and an orthographic projection of the shielding electrode on an array substrate plane is at least partially overlapped with an orthographic projection of the ground protection line on the array substrate plane and at least partially overlapped with an orthographic projection of the clock signal line on the array substrate plane.

In an exemplary embodiment, at least two clock signal lines have equal line widths. Here, "equal" is not strictly meant, and values within a range of process and measurement errors are allowed.

In an exemplary embodiment, the non-display area may further include at least one dummy trace arranged between two adjacent clock signal lines. In this way, device layout and process uniformity may be ensured.

In an exemplary embodiment, the dummy trace may include continuous traces or discontinuous traces.

In an exemplary embodiment, the dummy trace may include a plurality of dummy trace segments and a discontinuous portion between two adjacent dummy trace segments.

In an exemplary embodiment, the dummy trace has the same shape as the clock signal line. Here, "the same shape" is not strictly meant, and it may mean that the lines are approximately the same, and there may be some small deformation caused by tolerance.

In an exemplary embodiment, the dummy trace and the clock signal line are arranged on the same layer. Thus, the dummy trace and the clock signal line may be formed by a one-time patterning process, which has little improvement on the existing process, neither increases the number of patterning processes nor increases the structural film layer, and has simple preparation process, low production cost and convenient implementation.

In an exemplary embodiment, the non-display area may include two clock signal lines or four clock signal lines. Of course, it may also be other numbers, and here, the embodiment of the present disclosure is not limited to this.

For example, taking a line segment of the clock signal line located on a side of the display area in a direction opposite to the first direction DR1 as a reference, a spacing between adjacent clock signal lines (also referred to as center spacing) may refer to a distance between center points of the two adjacent clock signal lines in the first direction DR1, or may refer to a distance between edges on the same side of the two adjacent clock signal lines in the first direction DR1. Correspondingly, the line width of the clock signal line may refer to a dimensional feature of the clock signal line in the first direction DR1.

For example, taking a line segment of the clock signal line located on a side of the display area in the second direction DR2 or a line segment of the clock signal line located on a side of the display area in a direction opposite to the second direction as a reference, a spacing between adjacent clock signal lines (also referred to as center spacing) may refer to a distance between center points of the two adjacent clock signal lines in the second direction DR2, or may refer to a distance between edges on the same side of the two adjacent clock signal lines in the second direction DR2. Correspondingly, the line width of the clock signal line may refer to a dimensional feature of the clock signal line in the second direction DR2.

Taking the non-display area of the array substrate including two clock signal lines as an example, a structure of the array substrate in an embodiment of the present disclosure will be described with reference to the drawings.

Figure 2:
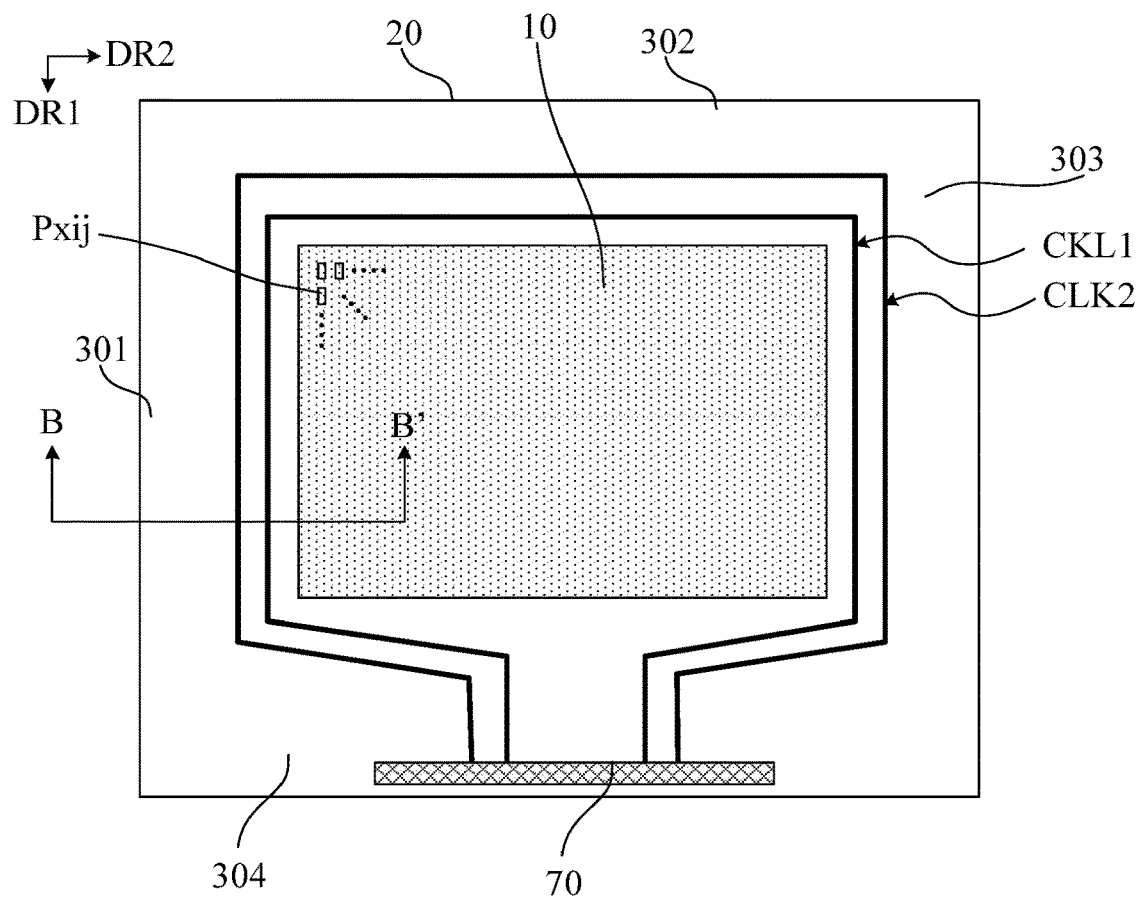
FIG. 2 is a schematic diagram of a first structure of an array substrate according to an exemplary embodiment of the present disclosure.
Figure 3:
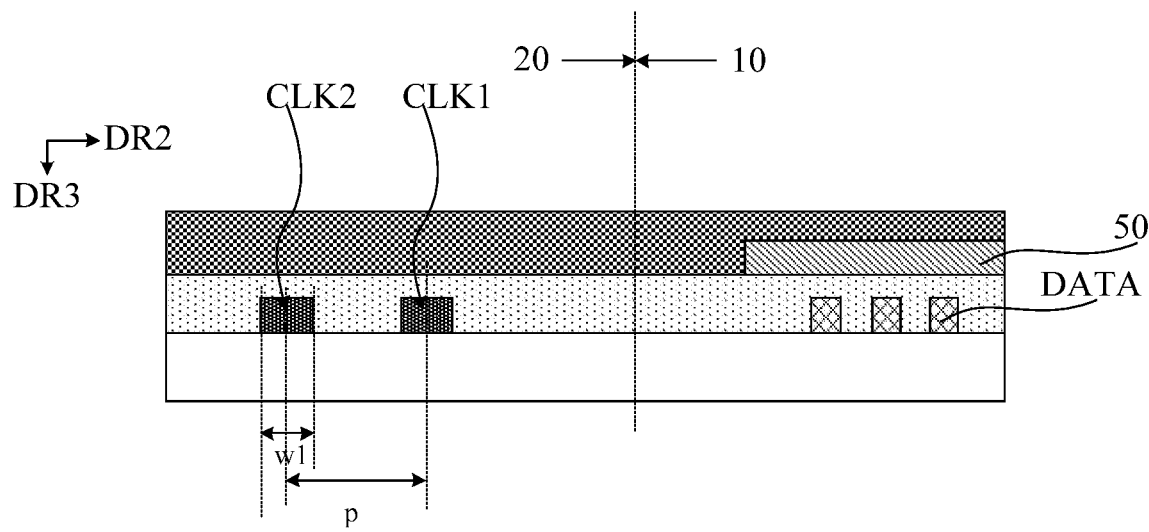
FIG. 3 is a schematic cross-sectional view of the array substrate shown in FIG. 2 in a BB' direction.
Figure 4:
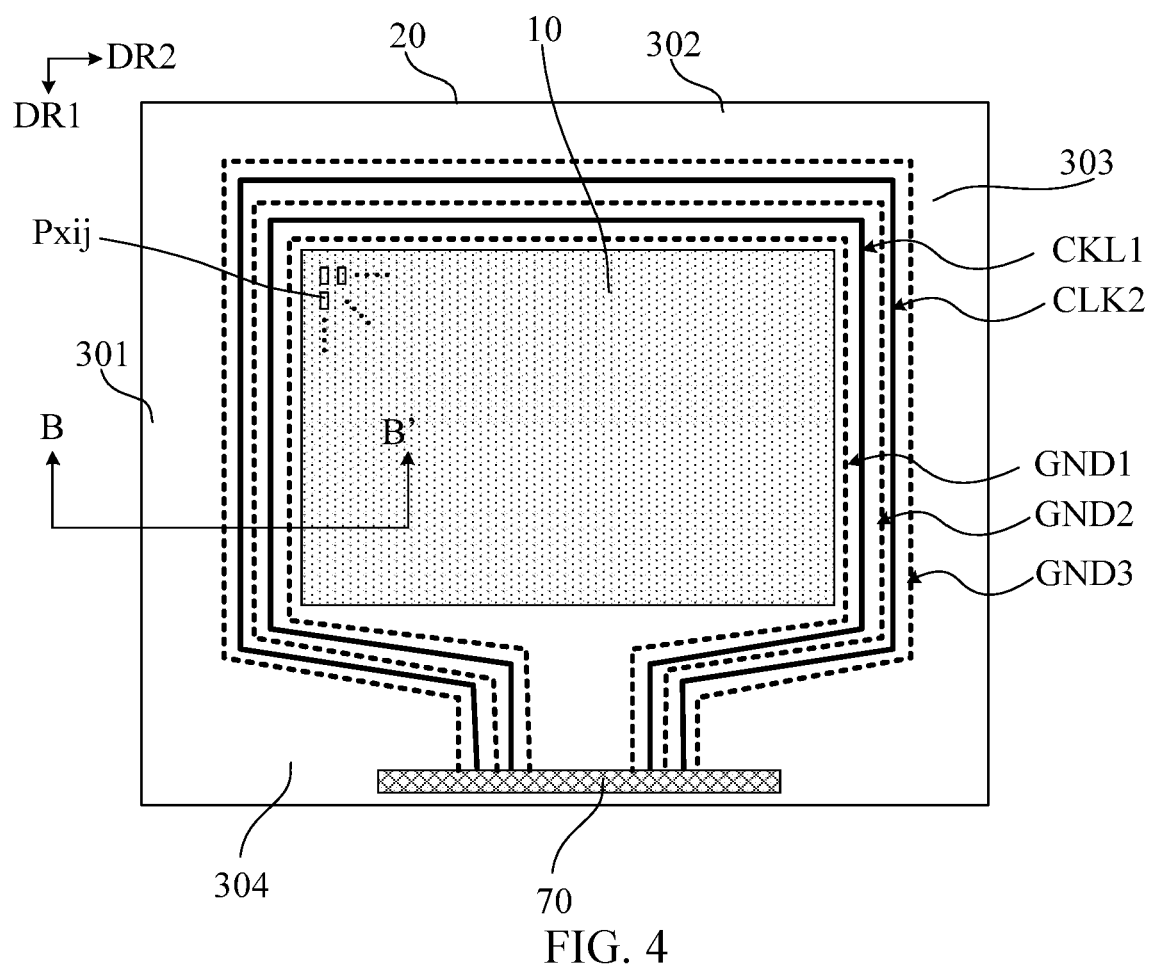
FIG. 4 is a schematic diagram of a second structure of an array substrate according to an exemplary embodiment of the present disclosure.
Figure 5:
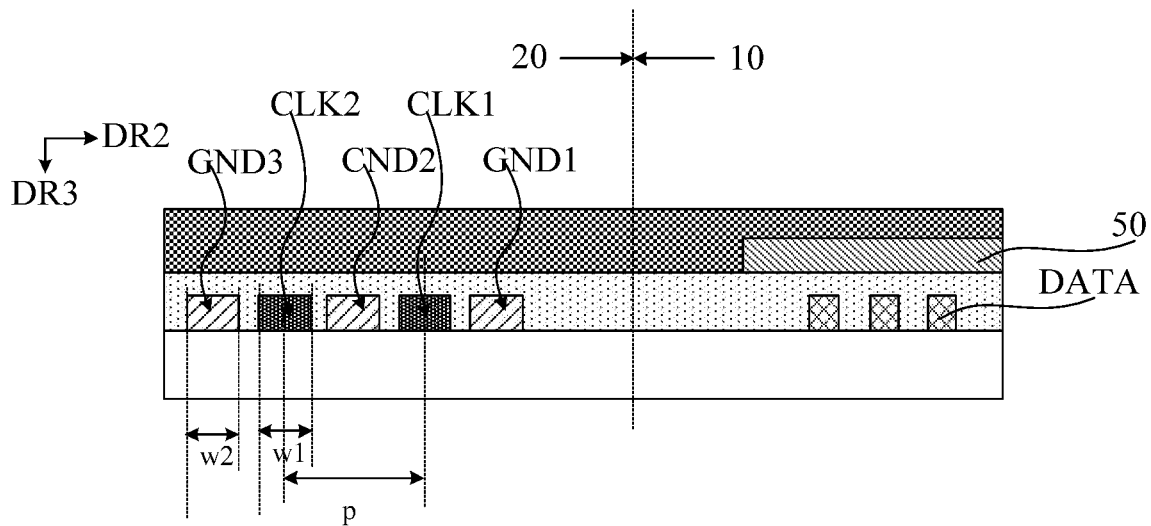
FIG. 5 is a schematic cross-sectional view of the array substrate shown in FIG. 4 in a BB' direction.
Figure 6:
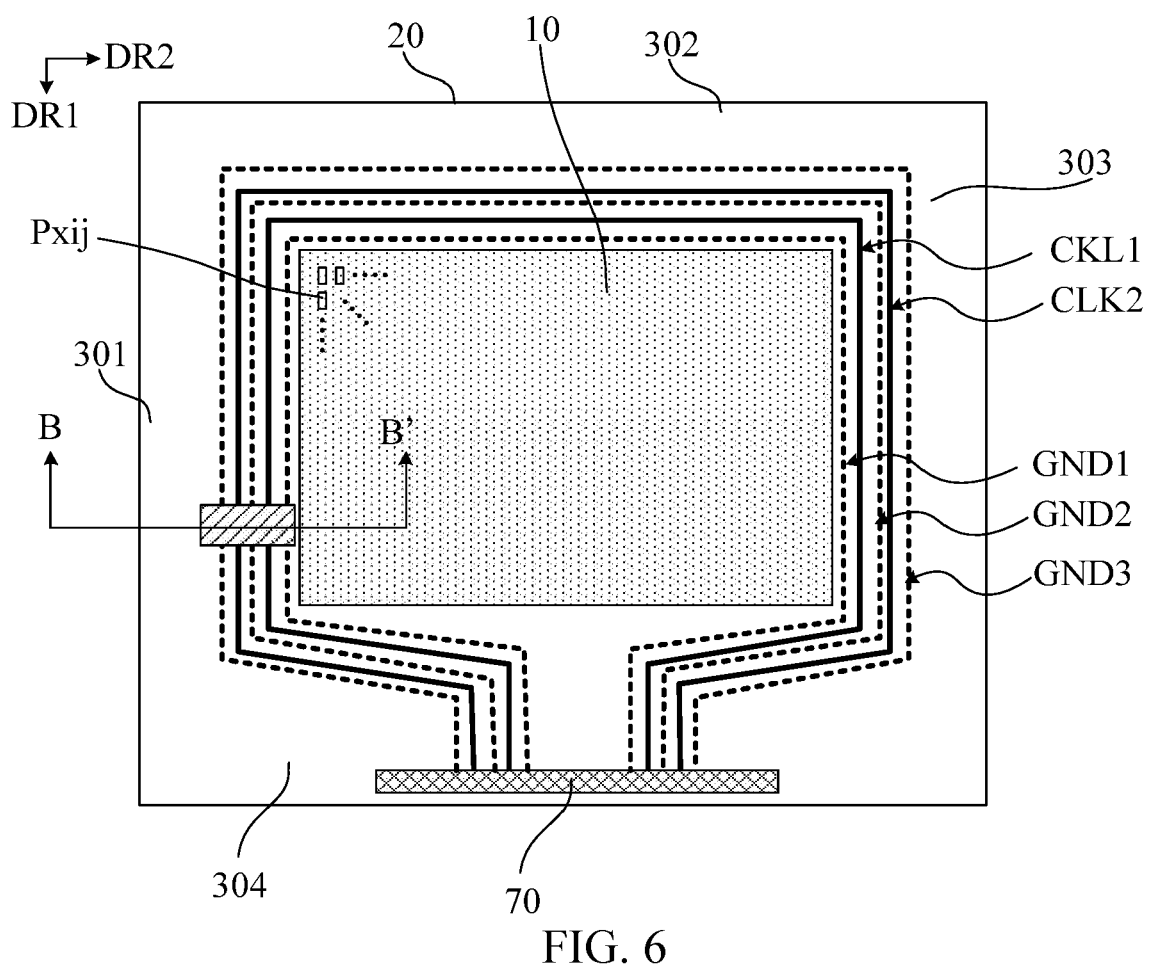
FIG. 6 is a schematic diagram of a third structure of an array substrate according to an exemplary embodiment of the present disclosure.
Figure 7:
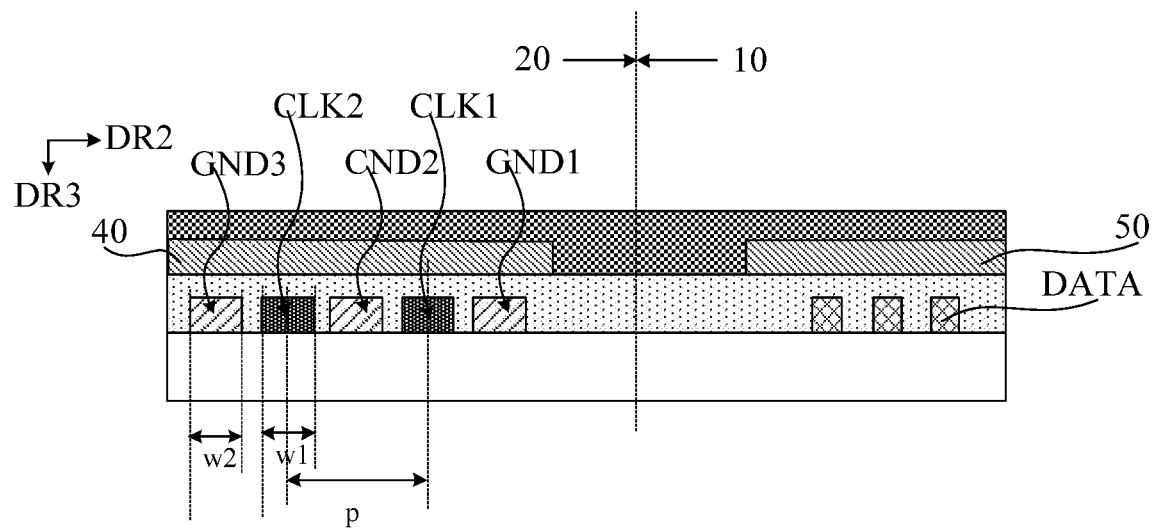
FIG. 7 is a schematic cross-sectional view of the array substrate shown in FIG. 6 in a BB' direction.
Figure 8:
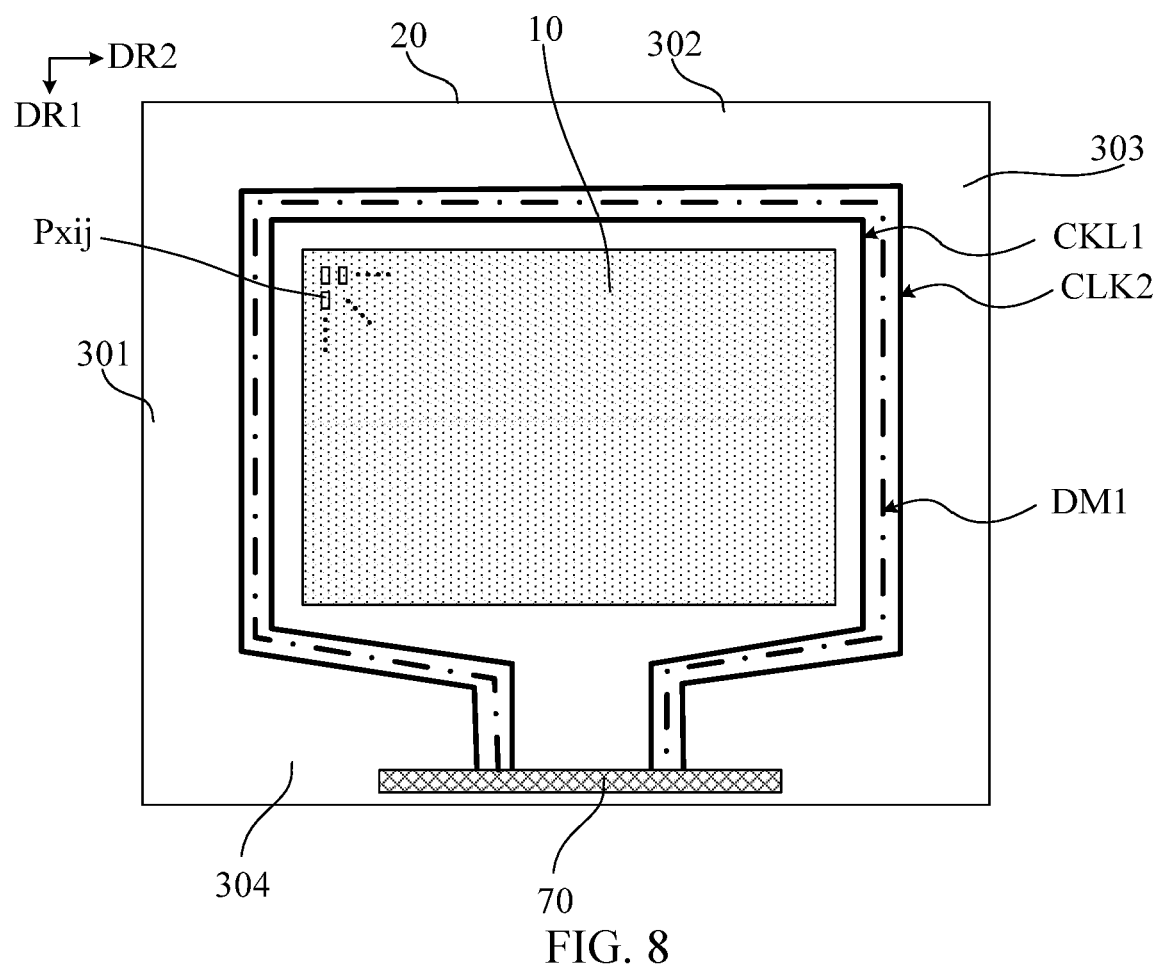
FIG. 8 is a schematic diagram of a fourth structure of an array substrate according to an exemplary embodiment of the present disclosure.
Figure 9:
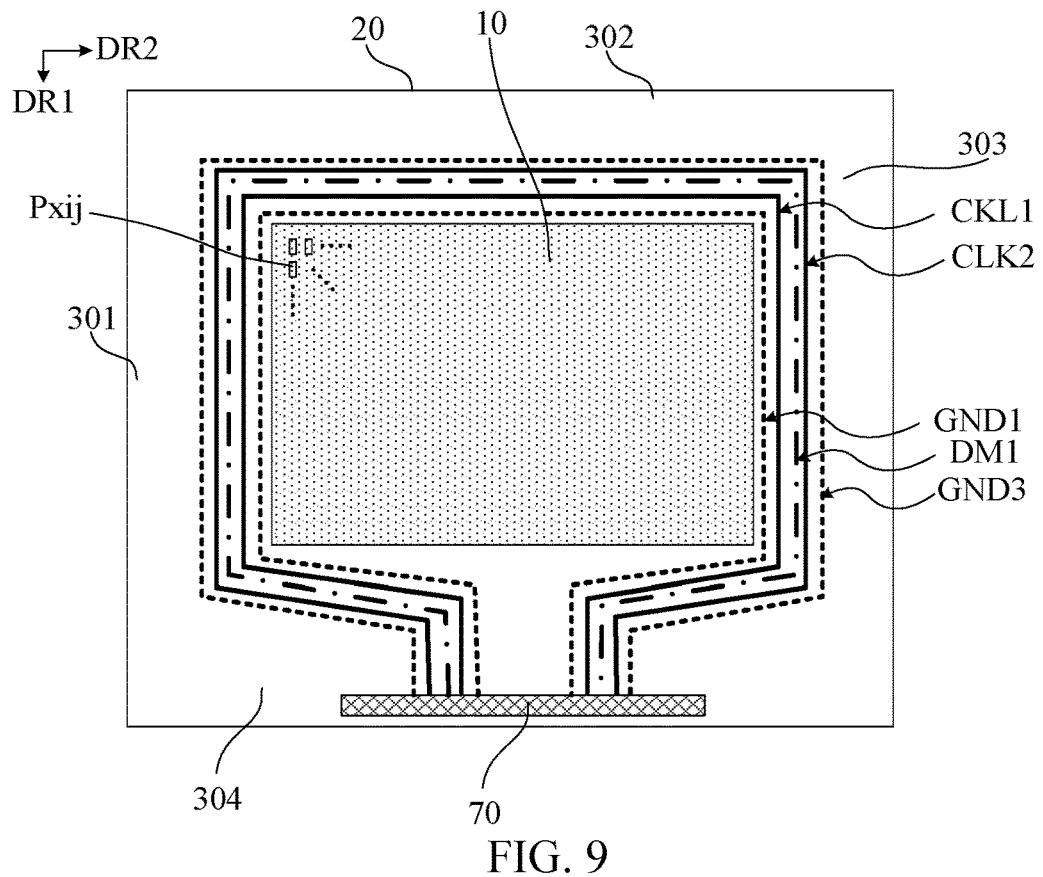
FIG. 9 is a schematic diagram of a fifth structure of an array substrate according to an exemplary embodiment of the present disclosure.

FIG. 2 is a schematic diagram of a first structure of an array substrate according to an exemplary embodiment of the present disclosure; FIG. 3 is a schematic cross-sectional view of the array substrate shown in FIG. 2 in a BB' direction; FIG. 4 is a schematic diagram of a second structure of an array substrate according to an exemplary embodiment of the present disclosure; FIG. 5 is a schematic cross-sectional view of the array substrate shown in FIG. 4 in a BB' direction; FIG. 6 is a schematic diagram of a third structure of an array substrate according to an exemplary embodiment of the present disclosure; FIG. 7 is a schematic cross-sectional view of the array substrate shown in FIG. 6 in a BB' direction; FIG. 8 is a schematic diagram of a fourth structure of an array substrate according to an exemplary embodiment of the present disclosure; and FIG. 9 is a schematic diagram of a fifth structure of an array substrate according to an exemplary embodiment of the present disclosure. Here, traces in FIGS. 2 to 9 are only an exemplary description, a quantity of traces does not represent an actual quantity, and a shape of the trace does not represent an actual shape. FIGS. 2, 4, 6, 8 and 9 are schematic illustrations in which an external shape of the display area 10 and an external shape of the non-display area 20 are both rectangular, and the external shapes of the display area 10 and the non-display area 20 do not represent the actual shape. In FIG. 2, 4, 6, 8 or 9, the clock signal line is illustrated by a solid line, the ground protection line is illustrated by a dotted line, and the dummy trace is illustrated by a dash line.

In an exemplary embodiment, as shown in FIGS. 2 to 9, the array substrate may include a display area 10 and a non-display area 20 located around the display area 10, wherein the non-display area 20 may include a bonding area 304 located on one side of the display area 10 and a frame area located on the other side of the display area 100. For example, the bonding area 304 may be located on one side of the display area 10 in a first direction DR1. For example, the frame area may include a first trace area 301 located on a side of the display area 10 in a direction opposite to the second direction DR2, a second trace area 302 located on a side of the display area in a direction opposite to the first direction DR1, and a third trace area 303 located on a side of the display area 10 in the second direction DR2.

In an exemplary embodiment, as shown in FIGS. 2 to 9, the non-display area 20 may include two clock signal lines. The two clock signal lines may include a first clock signal line CLK1 located on a side close to the display area 10 and a second clock signal line CLK2 located on a side of the first clock signal line CLK1 away from the display area 10, wherein the line widths of the first clock signal line CLK1 and the second clock signal line CLK2 are equal (i.e., line width w1 of the clock signal line), and a ratio of the spacing p between the first clock signal line CLK1 and the second clock signal line CLK2 to the line width w1 of the clock signal line is greater than or equal to 3. In this case, the wiring structure of the clock signal line may be more reasonable. Therefore, when a high-frequency clock signal passes through the clock signal line, induction of a signal on adjacent signal lines may be avoided, the crosstalk of the clock signals may also be avoided, and noise interference generated by mutual coupling of electromagnetic fields in the transmission process of clock signals may be eliminated, thereby improving the electromagnetic compatibility performance.

In an exemplary embodiment, the spacing p between the first clock signal line CLK1 and the second clock signal line CLK2 may be greater than 5 μm (microns).

In an exemplary embodiment, as shown in FIGS. 4 to 5, taking the non-display area 20 including two clock signal lines, i.e., the first clock signal line CLK1 and the second clock signal line CLK2 as an example, the non-display area 20 may further include three ground protection lines. The three ground protection lines may include a first ground protection line GND1, a second ground protection line GND2 and a third ground protection line GND3. The first ground protection line GND1 is arranged on a side of the first clock signal line CLK1 close to the display area 10, the second ground protection line GND2 is arranged between the first clock signal line CLK1 and the second clock signal line CLK2, and the third ground protection line GND3 is arranged on a side of the second clock signal line CLK2 away from the display area 10. In this way, by respectively arranging the first ground protection line GND1 and the second ground protection line GND2 at gaps on both sides of the first clock signal line CLK1, and respectively arranging the second ground protection line GND2 and the third ground protection line GND3 at gaps on both sides of the second clock signal line CLK2, when a high-frequency clock signal is transmitted on the first clock signal line CLK1 and the second clock signal line CLK2, a coupled electric field between the lines may be converted into electric field of the respective signal lines to the ground, thereby suppressing crosstalk between the signal lines, reducing the transmission frequency of the signal lines, and effectively improving the electromagnetic compatibility performance.

In an exemplary embodiment, as shown in FIG. 5, the first clock signal line CLK1, the second clock signal line CLK2, the first ground protection line GND1, the second ground protection line GND2, and the third ground protection line GND3 are arranged on the same layer. In this way, a plurality of ground protection lines and a plurality of clock signal lines may be formed by a one-time patterning process, which has little improvement on the existing process, neither increases the number of patterning processes nor increases the structural film layer, and has simple preparation process, low production cost and convenient implementation.

In an exemplary embodiment, as shown in FIG. 5, the display area 10 may further include a plurality of data lines DATA, wherein the first clock signal line CLK1, the second clock signal line CLK2, the first ground protection line GND1, the second ground protection line GND2, and the third ground protection line GND3 are arranged on the same layer as the data line DATA. Therefore, the ground protection lines, the clock signal lines and the data lines may be formed by a one-time patterning process, which has little improvement on the existing process, neither increases the number of patterning processes nor increases the structural film layer, and has simple preparation process, low production cost and convenient implementation.

In an exemplary embodiment, as shown in FIGS. 6 to 7, taking the non-display area 20 including two clock signal lines, i.e., the first clock signal line CLK1 and the second clock signal line CLK2 as an example, the non-display area 20 may further include three ground protection lines and a shielding electrode 40. The three ground protection lines may include: a first ground protection line GND1, a second ground protection line GND2 and a third ground protection line GND3. The first ground protection line GND1 is arranged on a side of the first clock signal line CLK1 close to the display area 10, the second ground protection line GND2 is arranged between the first clock signal line CLK1 and the second clock signal line CLK2, and the third ground protection line GND3 is arranged on a side of the second clock signal line CLK2 away from the display area 10. An insulating layer is arranged between the ground protection line and the shielding electrode 40. Via holes are arranged in the insulating layer. The shielding electrode 40 may be connected with the first ground protection line GND1, the second ground protection line GND2 and the third ground protection line GND3 through via holes. In this way, by respectively arranging the first ground protection line GND1 and the second ground protection line GND2 at gaps on both sides of the first clock signal line CLK1, respectively arranging the second ground protection line GND2 and a third ground protection line GND3 at gaps on both sides of the second clock signal line CLK2, and digging holes on an upper insulating layer, a ground signal is connected to the upper layer shielding electrode 40, so that the ground lines on both sides of the clock signal line and the upper shielding electrode build a bridge structure, which shields the clock signal lines with longer periphery, avoids mutual interference between the protection clock signal lines, and avoids electromagnetic interference caused by external systems to the clock signal lines, thereby greatly improving the electromagnetic compatibility performance.

In an exemplary embodiment, an insulating layer (also referred to as a planarization layer) is provided between the ground protection line and the shielding electrode 40 to achieve a planarization effect.

In an exemplary embodiment, as shown in FIG. 7, the display area 10 may further include a common electrode 50, and the shielding electrode 40 and the common electrode 50 are arranged on the same layer. Thus, the shielding electrode 40 and the common electrode 50 may be formed by a one-time patterning process, which has little improvement on the existing process, neither increases the number of patterning processes nor increases the structural film layer, and has simple preparation process, low production cost and convenient implementation.

In an exemplary embodiment, the materials of the shielding electrode 40 and the common electrode 50 may be the same or different.

In an exemplary embodiment, as shown in FIG. 7, the shielding electrode 40 is arranged on a different layer from the first ground protection line GND1, the second ground protection line GND2, and the third ground protection line GND3, and is arranged on a different layer from the first clock signal line CLK1 and the second clock signal line CLK2.

In an exemplary embodiment, as shown in FIG. 7, an orthographic projection of the shielding electrode 40 on the array substrate plane is at least partially overlapped with an orthographic projection of the first ground protection line GND1, the second ground protection line GND2, and the third ground protection line GND3 on the array substrate plane, and is at least partially overlapped with an orthographic projection of the first clock signal line CLK1 and the second clock signal line CLK2 on the array substrate plane.

In an exemplary embodiment, as shown in FIG. 8, taking the non-display area 20 including two clock signal lines, i.e., the first clock signal line CLK1 and the second clock signal line CLK2, as an example, the non-display area 20 may further include a dummy trace, i.e., a first dummy trace DM1, which is arranged between the first clock signal line CLK1 and the second clock signal line CLK2. Thus, by arranging the ratio of the spacing p between the first clock signal line CLK1 and the second clock signal line CLK2 to the line width w1 of the clock signal line to be greater than or equal to 3, when a high-frequency clock signal passes through the first clock signal line CLK1 and the second clock signal line, induction of a signal on adjacent signal lines may be avoided, and the crosstalk of the clock signals may also be avoided, thereby eliminating noise interference generated by mutual coupling of electromagnetic fields in the transmission process of clock signals, and improving the electromagnetic compatibility performance. Furthermore, by arranging the first dummy trace DM1, the uniformity of the array substrate may be ensured.

In an exemplary embodiment, as shown in FIG. 9, taking the non-display area 20 including two clock signal lines, i.e., the first clock signal line CLK1 and the second clock signal line CLK2, as an example, the non-display area 20 may further include two ground protection lines and one dummy trace. The one dummy trace may include a first dummy trace DM1. The first dummy trace DM1 is arranged between the first clock signal line CLK1 and the second clock signal line CLK2. The two ground protection lines may include a first ground protection line GND1 arranged on a side of the first clock signal line CLK1 close to the display area 10, and a third ground protection line GND3 arranged on a side of the second clock signal line CLK2 away from the display area 10. Thus, by respectively arranging the first ground protection line GND1 and the third ground protection line GND3 at gaps on both sides of the first clock signal line CLK1 and the second ground protection line GND2, when a high-frequency clock signal is transmitted on the first clock signal line CLK1 and the second clock signal line CLK2, a coupled electric field between the lines may be converted into electric field of the respective signal lines to the ground, thereby suppressing crosstalk between the signal lines, reducing the transmission frequency of the signal lines, and effectively improving the electromagnetic compatibility performance. Furthermore, by arranging the first dummy trace DM1, the uniformity of the array substrate may be ensured.

In an exemplary embodiment, the dummy trace DM1 may be at least one of a continuous trace and a discontinuous trace.

In an exemplary embodiment, as shown in FIG. 2, 4, 6, 8, or 9, the first clock signal line CLK1 and the second clock signal line CLK2 may each include a first clock signal line segment, a second clock signal line segment and a third clock signal line segment which are sequentially connected, wherein the first clock signal line segment extends in the first direction DR1 and is located in the first trace area 301, the second clock signal line segment extends in a second direction DR2 and is located in the second trace area 302, the third clock signal segment extends in the first direction DR1 and is located in the third wiring area 303; a first end of the first clock signal segment is connected to a first end of the second clock signal line segment, and a second end of the second clock signal line segment is connected to a first end of the third clock signal line segment.

In an exemplary embodiment, as shown in FIG. 2, 4, 6, 8, or 9, the bonding area 304 may include a fan-out area and a drive chip area. For example, the driver chip area may include an integrated circuit (IC) 70. The first clock signal line CLK1 and the second clock signal line CLK2 may each further include a first clock fan-out line and a second clock fan-out line located in the fan-out area of the bonding area 304. A first end of the first clock fan-out line is connected to a second end of the first clock signal segment, a second end of the first clock fan-out line is connected to the integrate circuit, a first end of the second clock fan-out line is connected to a second end of the third clock signal line segment, and a second end of the second clock fan-out line is connected to the integrate circuit 70.

As shown in FIGS. 2 to 9, the line width (i.e. w1) of the first clock signal line CLK1 may refer to a dimensional feature of the first clock signal line segment in the first clock signal line CLK1 in the second direction DR2, or may refer to a dimensional feature of the second clock signal line segment in the first clock signal line CLK1 in the first direction DR1, or may refer to a dimensional feature of the third clock signal line segment in the first clock signal line CLK1 in the second direction DR2, etc. Similarly, the line width (i.e. w1) of the second clock signal line CLK2 may refer to a dimensional feature of the first clock signal line segment in the second clock signal line CLK2 in the second direction DR2, or may refer to a dimensional feature of the second clock signal line segment in the second clock signal line CLK2 in the first direction DR1, or may refer to a dimensional feature of the third clock signal line segment in the second clock signal line CLK2 in the second direction DR2, etc. Here, the embodiment of the present disclosure is not limited to this.

In an exemplary embodiment, as shown in FIG. 4 or 6, the first ground protection line GND1, the second ground protection line GND2, and the third ground protection line GND3 may each include a first ground protection line segment, a second ground protection line segment and a third ground protection line segment which are sequentially connected, wherein the first ground protection line segment extends in the first direction DR1 and is located in the first trace area 301, the second ground protection line segment extends in the second direction DR2 and is located in the second trace area 302, the third ground protection line segment extends in the first direction DR1 and is located in the third trace area 303, a first end of the first ground protection line segment is connected to a first end of the second ground protection line segment, and a second end of the second ground protection line segment is connected to a first end of the third ground protection line segment.

In an exemplary embodiment, as shown in FIG. 4 or 6, the first ground protection line GND1, the second ground protection line GND2, and the third ground protection line GND3 may each further include a first ground fan-out line and a second ground fan-out line located in the fan-out area of the bonding area 304. A first end of the first ground fan-out line is connected to a second end of a first ground signal segment, a second end of the first ground fan-out line is connected to the integrate circuit, a first end of the second ground fan-out line is connected to a second end of a third ground signal segment, and a second end of the second ground fan-out line is connected to the integrate circuit 70.

In an exemplary embodiment, as shown in FIG. 4 or 6, the first ground protection line segment is parallel to the first clock signal line segment, the second ground protection line segment is parallel to the second clock signal line segment, and the third ground protection line segment is parallel to the third clock signal line segment.

In an exemplary embodiment, as shown in FIG. 5 or 7, the line widths of the first ground protection line GND1, the second ground protection line GND2, and the third ground protection line GND3 may be equal.

In an exemplary embodiment, as shown in FIG. 5 or 7, a ratio of the line widths (i.e., w2) of the first ground protection line GND1, the second ground protection line GND2 and the third ground protection line GND3 to the line widths (i.e., w1) of the first clock signal line CLK1 and the second clock signal line CLK2 may be about 0.8 to 1.2. For example, the line widths (i.e., w2) of the first ground protection line GND1, the second ground protection line GND2 and the third ground protection line GND3 may be equal to the line widths (i.e., w1) of the first clock signal line CLK1 and the second clock signal line CLK2. Here, the embodiment of the present disclosure is not limited to this.

In an exemplary embodiment of the present disclosure, on one hand, by arranging a ratio of a spacing between two adjacent clock signal lines to a line width of the clock signal lines to be greater than or equal to 3, the wiring structure of the clock signal lines may be reasonable. Therefore, when a high-frequency clock signal passes through the clock signal line, induction of a signal on adjacent signal lines may be avoided, the crosstalk of the clock signals may also be avoided, and noise interference generated by mutual coupling of electromagnetic fields in the transmission process of clock signals may be eliminated, thereby improving the electromagnetic compatibility performance. On the other hand, by arranging ground protection lines at gaps on both sides of the clock signal lines, when a high frequency clock signal is transmitted on the clock signal line, a coupled electric field between the lines may be converted into electric field of the respective signal lines to the ground, thereby suppressing crosstalk between the signal lines, reducing the transmission frequency of the signal lines, and effectively improving the electromagnetic compatibility performance. Moreover, by arranging ground protection lines at gaps on both sides of the clock signal lines and digging holes on an upper insulating layer, a ground signal is connected to the upper layer shielding electrode, so that the ground protection lines on both sides of the clock signal line and the upper shielding electrode build a bridge structure, which shields the clock signal lines with longer periphery, avoids mutual interference between the protection clock signal lines, and avoids electromagnetic interference caused by external systems to the clock signal lines, thereby greatly improving the electromagnetic compatibility performance. In addition, by arranging a dummy trace between two adjacent clock signal lines, the uniformity of the array substrate may be ensured.

Taking the non-display area of the array substrate including four clock signal lines as an example, a structure of the array substrate in an embodiment of the present disclosure will be described with reference to the drawings.

Figure 10:
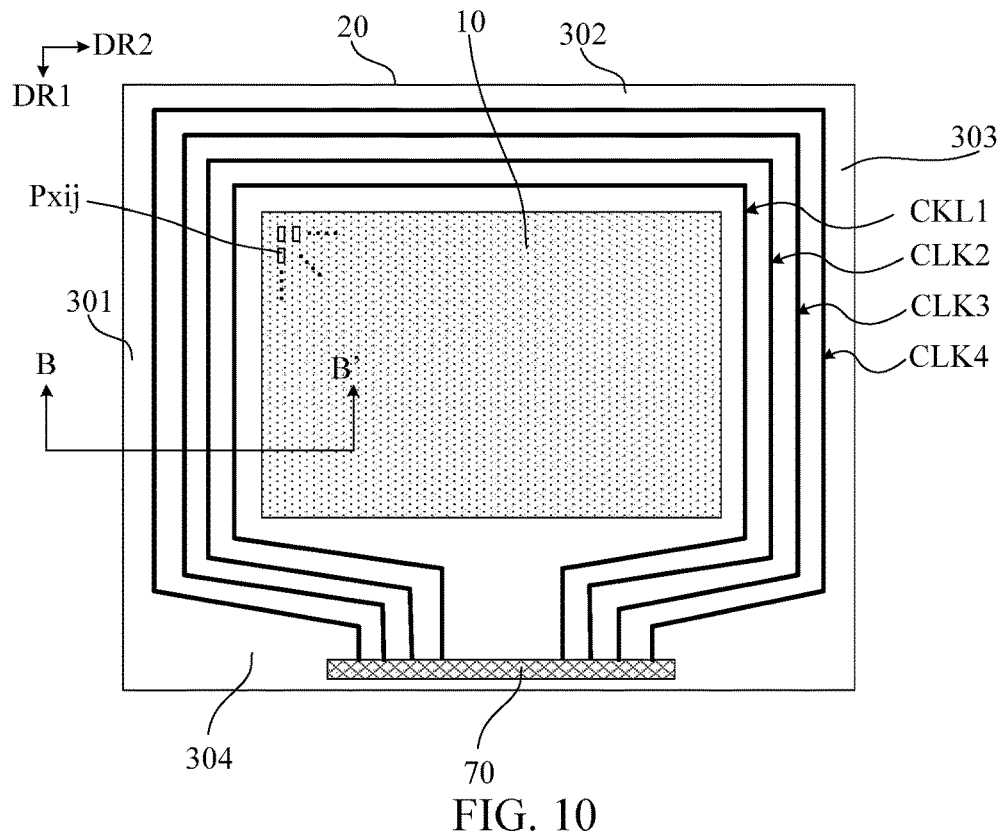
FIG. 10 is a schematic diagram of a fifth structure of an array substrate according to an exemplary embodiment of the present disclosure.
Figure 11:
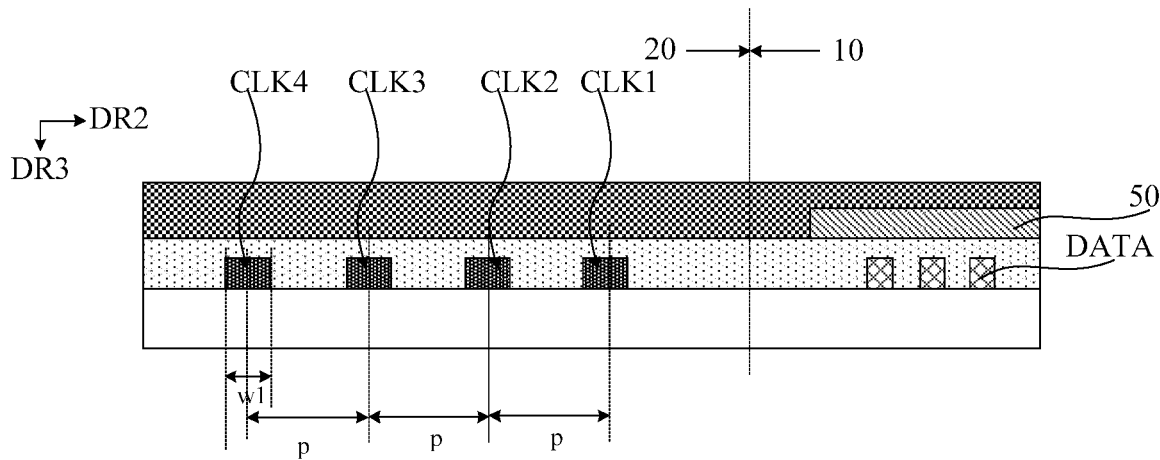
FIG. 11 is a schematic cross-sectional view of the array substrate shown in FIG. 10 in a BB' direction.
Figure 12:
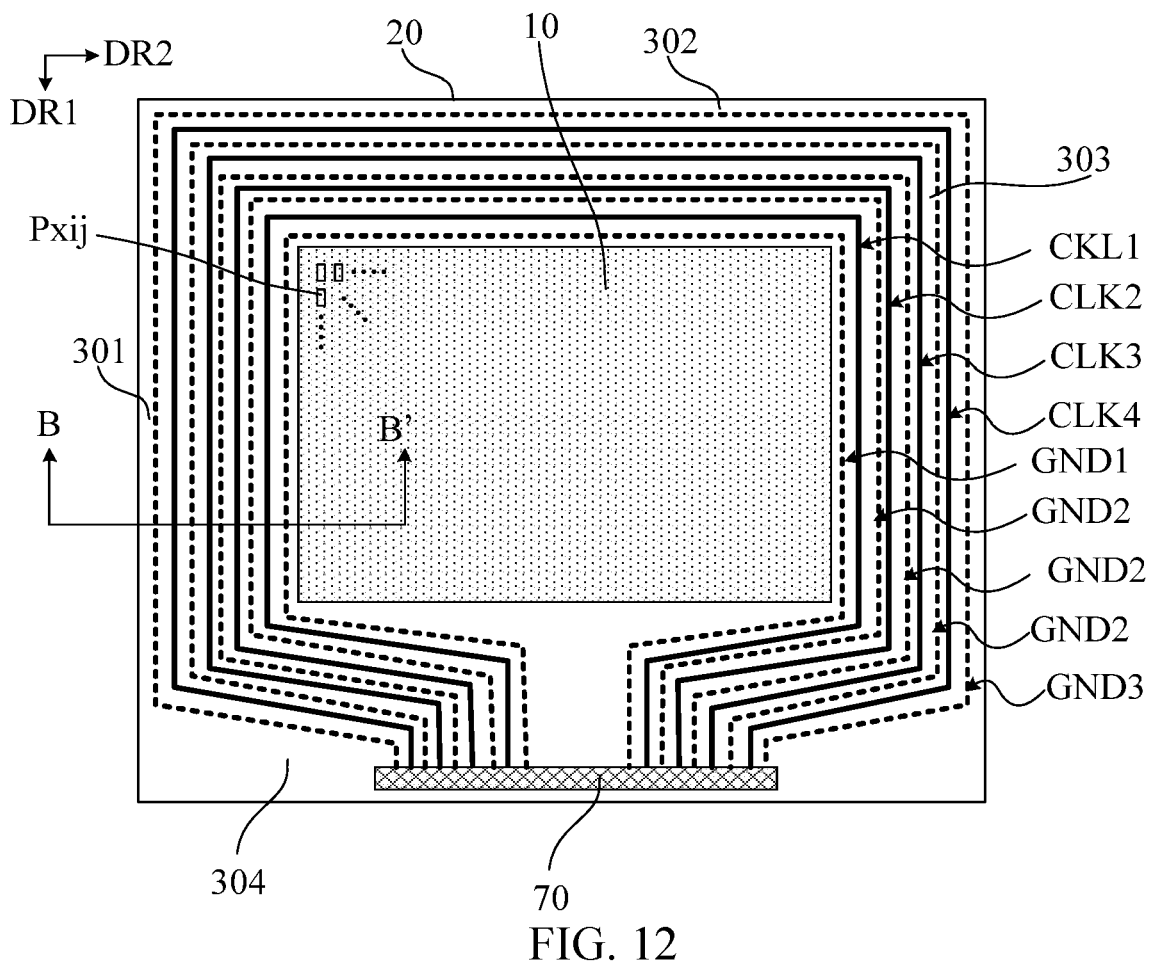
FIG. 12 is a schematic diagram of a seventh structure of an array substrate according to an exemplary embodiment of the present disclosure.
Figure 13:
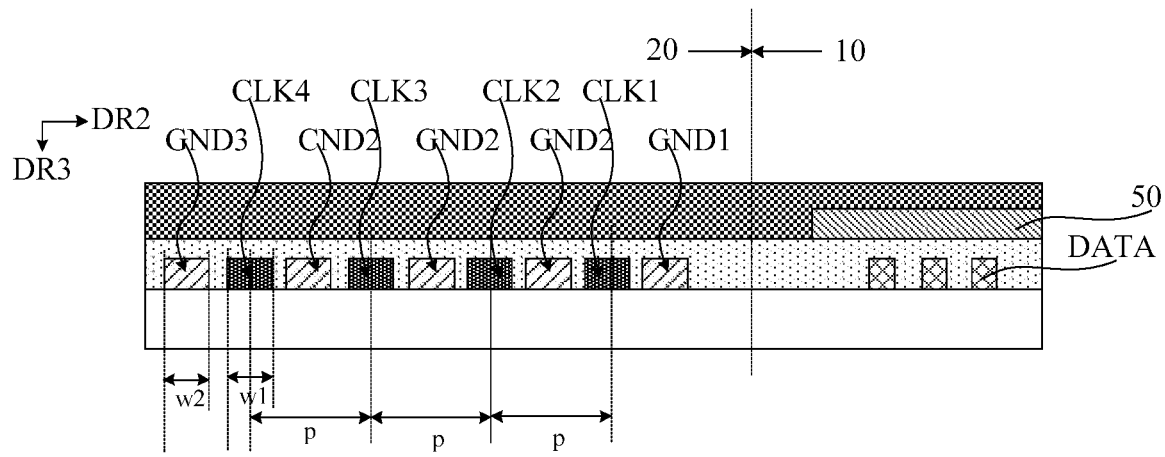
FIG. 13 is a schematic cross-sectional view of the array substrate shown in FIG. 12 in a BB' direction.
Figure 14:
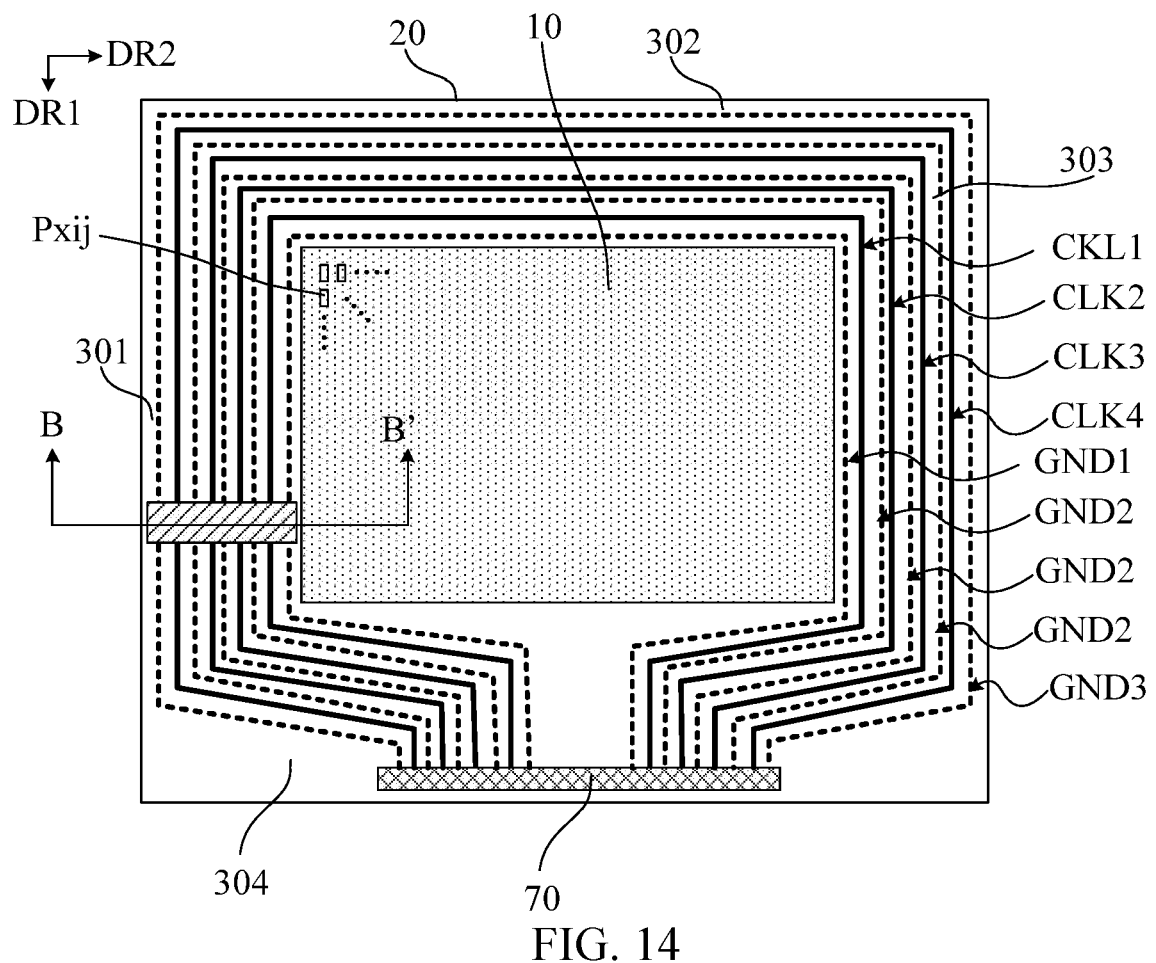
FIG. 14 is a schematic diagram of an eighth structure of an array substrate according to an exemplary embodiment of the present disclosure.
Figure 15:
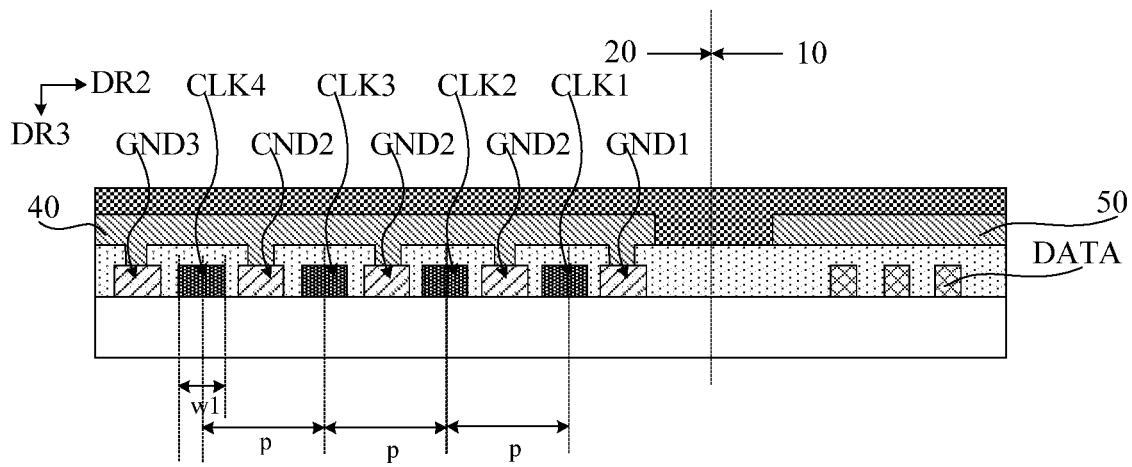
FIG. 15 is a schematic cross-sectional view of the array substrate shown in FIG. 14 in a BB' direction.
Figure 16:
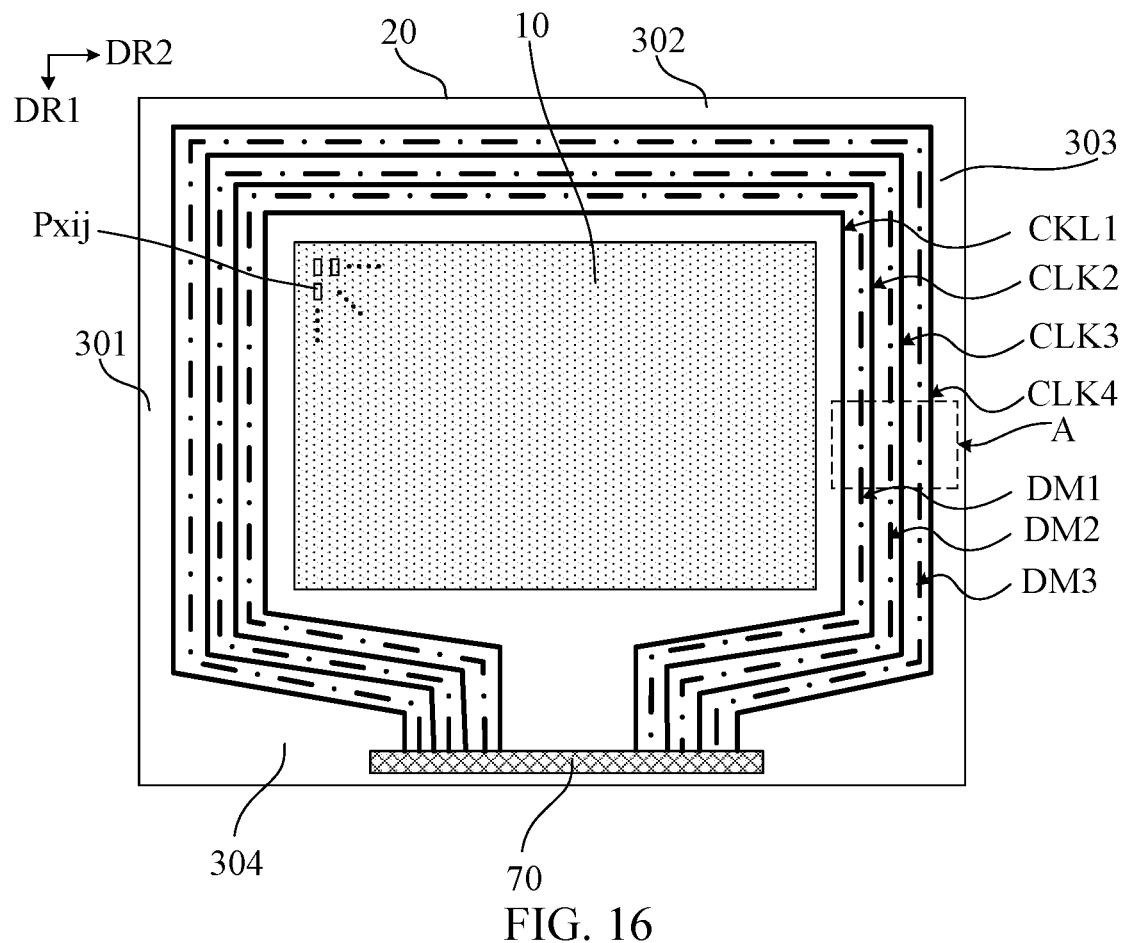
FIG. 16 is a schematic diagram of a ninth structure of an array substrate according to an exemplary embodiment of the present disclosure.
Figure 17:
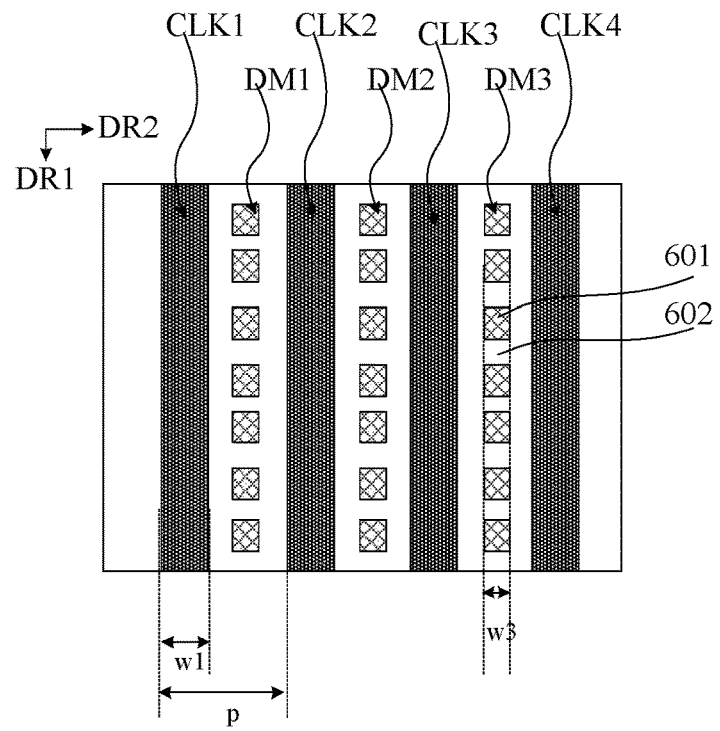
FIG. 17 is an enlarged schematic diagram of traces in a region A in the array substrate shown in FIG. 16.
Figure 18:
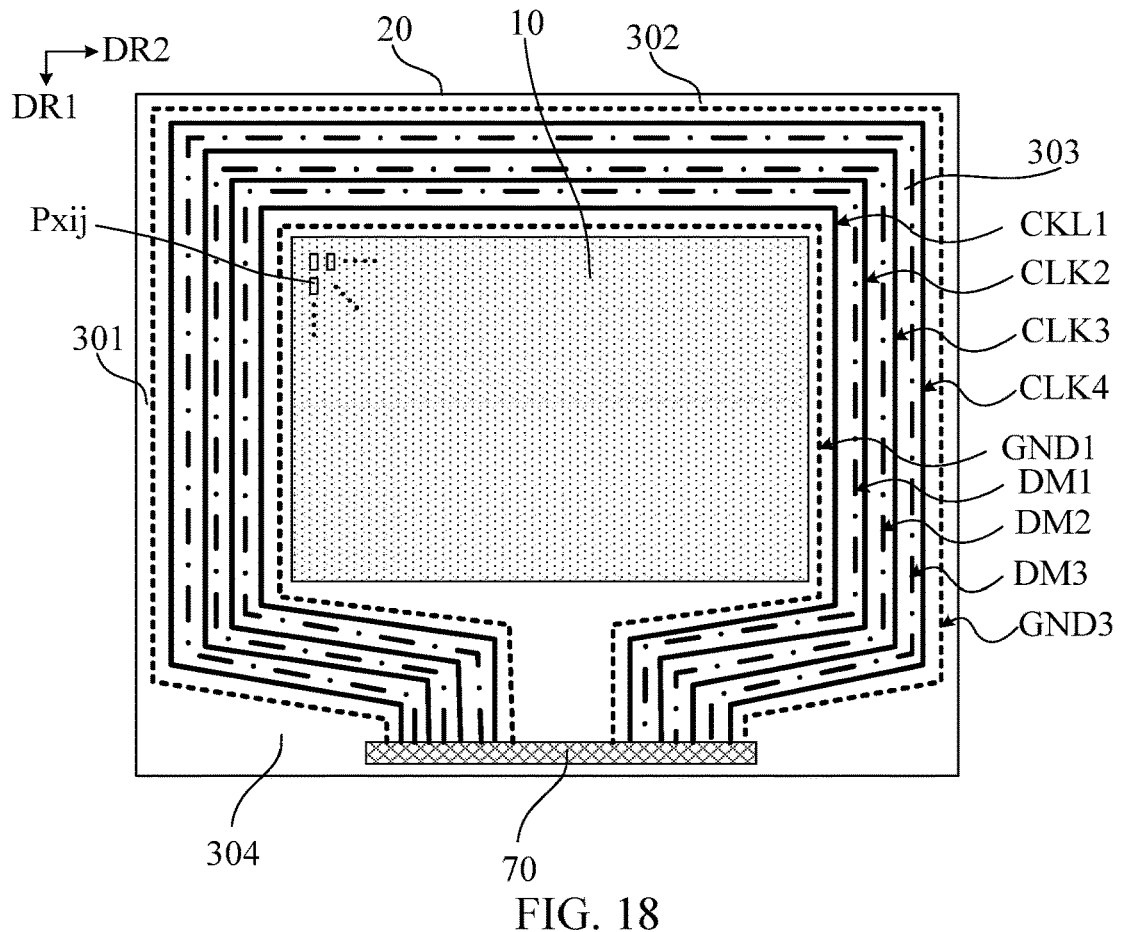
FIG. 18 is a schematic diagram of a tenth structure of an array substrate according to an exemplary embodiment of the present disclosure.

FIG. 10 is a schematic diagram of a fifth structure of an array substrate according to an exemplary embodiment of the present disclosure; FIG. 11 is a schematic cross-sectional view of the array substrate shown in FIG. 10 in a BB' direction; FIG. 12 is a schematic diagram of a seventh structure of an array substrate according to an exemplary embodiment of the present disclosure; FIG. 13 is a schematic cross-sectional view of the array substrate shown in FIG. 12 in a BB' direction; FIG. 14 is a schematic diagram of an eighth structure of an array substrate according to an exemplary embodiment of the present disclosure; FIG. 15 is a schematic cross-sectional view of the array substrate shown in FIG. 14 in a BB' direction; FIG. 16 is a schematic diagram of a ninth structure of an array substrate according to an exemplary embodiment of the present disclosure; FIG. 17 is an enlarged schematic diagram of traces in a region A in the array substrate shown in FIG. 16; and FIG. 18 is a schematic diagram of a tenth structure of an array substrate according to an exemplary embodiment of the present disclosure. Here, traces in FIGS. 10 to 18 are only an exemplary description, a quantity of traces does not represent an actual quantity, and a shape of the trace does not represent an actual shape. FIGS. 10, 12, 14, 16 and 18 are schematic illustrations in which an external shape of the display area 10 and an external shape of the non-display area 20 are both rectangular, and the external shapes of the display area 10 and the non-display area 20 do not represent the actual shape. In FIG. 10, 12, 14, 16, or 18, the clock signal line is illustrated by a solid line, the ground protection line is illustrated by a dotted line, and the dummy trace is illustrated by a dash line.

In an exemplary embodiment, as shown in FIGS. 10 to 18, the array substrate may include a display area 10 and a non-display area 20 located around the display area 10, wherein the non-display area 20 may include a bonding area 304 located on one side of the display area 10 and a frame area located on the other side of the display area 100. For example, the bonding area 304 may be located on one side of the display area 10 in a first direction DR1. For example, the frame area may include a first trace area 301 located on a side of the display area 10 in a direction opposite to the second direction DR2, a second trace area 302 located on a side of the display area in a direction opposite to the first direction DR1, and a third trace area 303 located on a side of the display area 10 in the second direction DR2.

In an exemplary embodiment, as shown in FIGS. 10 to 18, the non-display area 20 may include four clock signal lines. The four clock signal lines may include a first clock signal line CLK1 located on a side close to the display area 10, a second clock signal line CLK2 located on a side of the first clock signal line CLK1 away from the display area 10, a third clock signal line CLK3 located on a side of the second clock signal line CLK2 away from the display area 10, and a fourth clock signal line CLK4 located on a side of the third clock signal line CLK3 away from the display area 10, wherein the line widths of the first clock signal line CLK1, the second clock signal line CLK2, the third clock signal line CLK3 and the fourth clock signal line CLK4 are equal (i.e. w1), a spacing between the first clock signal line CLK1 and the second clock signal line CLK2, a spacing between the second clock signal line CLK2 and the third clock signal line CLK3, and a spacing between the third clock signal line CLK3 and the fourth clock signal line CLK4 are equal (i.e., p), and a ratio of the spacing p between two adjacent clock signal lines to the line width w1 of the clock signal lines is greater than or equal to 3. Therefore, when a high-frequency clock signal passes through the clock signal line, induction of a signal on adjacent signal lines may be avoided, the crosstalk of the clock signals may also be avoided, and noise interference generated by mutual coupling of electromagnetic fields in the transmission process of clock signals may be eliminated, thereby improving the electromagnetic compatibility performance.

In an exemplary embodiment, as shown in FIGS. 12 to 13, taking the non-display area 20 including four clock signal lines, i.e., the first clock signal line CLK1, the second clock signal line CLK2, the third clock signal line CLK3 and the fourth clock signal line CLK4, as an example, the non-display area 20 may further include five ground protection lines. The five ground protection lines may include a first ground protection line GND1, three second ground protection lines GND2 and a third ground protection line GND3. The first ground protection line GND1 is arranged on a side of the first clock signal line CLK1 close to the display area 10, a first second ground protection line GND2 is arranged between the first clock signal line CLK1 and the second clock signal line CLK2, a second second ground protection line GND2 is arranged between the second clock signal line CLK2 and the third clock signal line CLK3, a third second ground protection line GND2 is arranged between the third clock signal line CLK3 and the fourth clock signal line CLK4, and the third ground protection line GND3 is arranged on a side of the fourth clock signal line CLK4 away from the display area 10. In this way, ground protection lines are respectively arranged at gaps on both sides of the clock signal line. Therefore, when a high frequency clock signal is transmitted on the clock signal line, a coupled electric field between the lines may be converted into electric field of the respective signal lines to the ground, thereby suppressing crosstalk between the signal lines, reducing the transmission frequency of the signal lines, and effectively improving the electromagnetic compatibility performance.

In an exemplary embodiment, as shown in FIG. 13, the first clock signal line CLK1, the second clock signal line CLK2, the third clock signal line CLK3, the fourth clock signal line CLK4, the first ground protection line GND1, the second ground protection line GND2, and the third ground protection line GND3 are arranged on the same layer. In this way, a plurality of ground protection lines and a plurality of clock signal lines may be formed by a one-time patterning process, which has little improvement on the existing process, neither increases the number of patterning processes nor increases the structural film layer, and has simple preparation process, low production cost and convenient implementation.

In an exemplary embodiment, as shown in FIG. 13, the display area 10 may further include a plurality of data lines DATA, wherein the first clock signal line CLK1, the second clock signal line CLK2, the third clock signal line CLK3, the fourth clock signal line CLK4, the first ground protection line GND1, the second ground protection line GND2, and the third ground protection line GND3 are arranged on the same layer as the data line DATA. Therefore, the ground protection lines, the clock signal lines and the data lines may be formed by a one-time patterning process, which has little improvement on the existing process, neither increases the number of patterning processes nor increases the structural film layer, and has simple preparation process, low production cost and convenient implementation.

In an exemplary embodiment, As shown in FIGS. 14 to 15, taking the non-display area 20 including four clock signal lines, i.e., the first clock signal line CLK1, the second clock signal line CLK2, the third clock signal line CLK3 and the fourth clock signal line CLK4, as an example, the non-display area 20 may further include five ground protection lines and a shielding electrode 40. The five ground protection lines may include a first ground protection line GND1, three second ground protection lines GND2 and a third ground protection line GND3. The first ground protection line GND1 is arranged on a side of the first clock signal line CLK1 close to the display area 10, a first second ground protection line GND2 is arranged between the first clock signal line CLK1 and the second clock signal line CLK2, a second second ground protection line GND2 is arranged between the second clock signal line CLK2 and the third clock signal line CLK3, a third second ground protection line GND2 is arranged between the third clock signal line CLK3 and the fourth clock signal line CLK4, and the third ground protection line GND3 is arranged on a side of the fourth clock signal line CLK4 away from the display area 10. The shielding electrode 40 may be connected with the first ground protection line GND1, the second ground protection line GND2 and the third ground protection line GND3 through via holes. In this way, by respectively arranging ground protection lines at gaps on both sides of the clock signal lines and digging holes on an upper insulating layer, a ground signal is connected to the upper layer shielding electrode 40, so that the ground lines on both sides of the clock signal line and the upper shielding electrode build a bridge structure, which shields the clock signal lines with longer periphery, avoids mutual interference between the protection clock signal lines, and avoids electromagnetic interference caused by external systems to the clock signal lines, thereby greatly improving the electromagnetic compatibility performance.

In an exemplary embodiment, as shown in FIG. 15, the display area 10 may further include a common electrode 50, and the shielding electrode 40 and the common electrode 50 are arranged on the same layer. Thus, the shielding electrode 40 and the common electrode 50 may be formed by a one-time patterning process, which has little improvement on the existing process, neither increases the number of patterning processes nor increases the structural film layer, and has simple preparation process, low production cost and convenient implementation.

In an exemplary embodiment, as shown in FIG. 15, the shielding electrode 40 is arranged on a different layer from the first ground protection line GND1, the second ground protection line GND2, and the third ground protection line GND3, and is arranged on a different layer from the first clock signal line CLK1, the second clock signal line CLK2, the third clock signal line CLK3, and the fourth clock signal line CLK4.

In an exemplary embodiment, as shown in FIG. 15, an orthographic projection of the shielding electrode 40 on the array substrate plane is at least partially overlapped with an orthographic projection of the first ground protection line GND1, the second ground protection line GND2, and the third ground protection line GND3 on the array substrate plane, and is at least partially overlapped with an orthographic projection of the first clock signal line CLK1, the second clock signal line CLK2, the third clock signal line CLK3, and the fourth clock signal line CLK4 on the array substrate plane.

In an exemplary embodiment, as shown in FIGS. 16 and 17, taking the non-display area 20 including four clock signal lines, i.e., the first clock signal line CLK1, the second clock signal line CLK2, the third clock signal line CLK3 and the fourth clock signal line CLK4, as an example, the non-display area 20 may further include three dummy traces. The three dummy traces may include a first dummy trace DM1 arranged between the first clock signal line CLK1 and the second clock signal line CLK2, a second dummy trace DM2 arranged between the second clock signal line CLK2 and the third clock signal line CLK3, and a third dummy trace DM3 arranged between the third clock signal line CLK3 and the fourth clock signal line CLK4. Thus, by arranging the ratio of the spacing p between two adjacent clock signal lines to the line width w1 of the clock signal lines to be greater than or equal to 3, the wiring structure of the clock signal line may be more reasonable. Therefore, when a high-frequency clock signal passes through the clock signal line, induction of a signal on adjacent signal lines may be avoided, the crosstalk of the clock signals may also be avoided, and noise interference generated by mutual coupling of electromagnetic fields in the transmission process of clock signals may be eliminated, thereby improving the electromagnetic compatibility performance. Moreover, by arranging dummy traces, the uniformity of the array substrate may be ensured.

In an exemplary embodiment, the first dummy trace DM1, the second dummy trace DM2, and the third dummy trace DM3 may each be at least one of a continuous trace and a discontinuous trace.

In an exemplary embodiment, taking the dummy traces being discontinuous traces as an example, as shown in FIG. 17, the first dummy trace DM1, the second dummy trace DM2, and the third dummy trace DM3 may each include a plurality of dummy trace segments 601 and a discontinuous portion 602 located between two adjacent dummy trace segments 601. For example, the plurality of dummy trace segments 601 may be arranged at intervals along an extension direction of the clock signal line.

In an exemplary embodiment, as shown in FIG. 17, a line width w3 of the dummy trace may be smaller than the line width w1 of the clock signal line.

In an exemplary embodiment, as shown in FIG. 18, taking the non-display area 20 including four clock signal lines, i.e., the first clock signal line CLK1, the second clock signal line CLK2, the third clock signal line CLK3 and the fourth clock signal line CLK4, as an example, the non-display area 20 may further include two ground protection lines and three dummy traces. The two ground protection lines may include a first ground protection line GND1 arranged on a side of the first clock signal line CLK1 close to the display area 10 and a third ground protection line GND3 arranged on a side of the fourth clock signal line CLK4 away from the display area 10. The three dummy traces may include a first dummy trace DM1 arranged between the first clock signal line CLK1 and the second clock signal line CLK2, a second dummy trace DM2 arranged between the second clock signal line CLK2 and the third clock signal line CLK3, and a third dummy trace DM3 arranged between the third clock signal line CLK3 and the fourth clock signal line CLK4. Thus, by respectively arranging the first ground protection line GND1 and the third ground protection line GND3 at gaps on both sides of the first clock signal line CLK1 and the fourth ground protection line GND4, when a high-frequency clock signal is transmitted on the first clock signal line CLK1 and the fourth clock signal line CLK4, a coupled electric field between the lines may be converted into electric field of the respective signal lines to the ground, thereby suppressing crosstalk between the signal lines, reducing the transmission frequency of the signal lines, and effectively improving the electromagnetic compatibility performance. Moreover, by arranging a dummy trace between adjacent clock signal lines, the uniformity of the array substrate may be ensured.

In an exemplary embodiment, as shown in FIG. 10, 12, 14, 16 or 18, the first clock signal line CLK1, the second clock signal line CLK2, the third clock signal line CLK3, and the fourth clock signal line CLK4 may each include a first clock signal line segment, a second clock signal line segment and a third clock signal line segment which are sequentially connected, wherein the first clock signal line segment extends in the first direction DR1 and is located in the first trace area 301, the second clock signal line segment extends in the second direction DR2 and is located in the second trace area 302, the third clock signal line segment extends in the first direction DR1 and is located in the third trace area 303, a first end of the first clock signal segment is connected to a first end of the second clock signal line segment, and a second end of the second clock signal line segment is connected to a first end of the third clock signal line segment.

In an exemplary embodiment, as shown in FIG. 10, 12, 14, 16 or 18, the bonding area 304 may include a fan-out area and a drive chip area. For example, the driver chip area may include an integrated circuit 70. The first clock signal line CLK1, the second clock signal line CLK2, the third clock signal line CLK3, and the fourth clock signal line CLK4 may each further include a first clock fan-out line and a second clock fan-out line located in the fan-out area of the bonding area 304. A first end of the first clock fan-out line is connected to a second end of the first clock signal segment, a second end of the first clock fan-out line is connected to the integrate circuit, a first end of the second clock fan-out line is connected to a second end of the third clock signal line segment, and a second end of the second clock fan-out line is connected to the integrate circuit 70.

In an exemplary embodiment, as shown in FIG. 12 or 14, the first ground protection line GND1, the second ground protection line GND2, and the third ground protection line GND3 may each include a first ground protection line segment, a second ground protection line segment and a third ground protection line segment which are sequentially connected, wherein the first ground protection line segment extends in the first direction DR1 and is located in the first trace area 301, the second ground protection line segment extends in the second direction DR2 and is located in the second trace area 302, the third ground protection line segment extends in the first direction DR1 and is located in the third trace area 303, a first end of the first ground protection line segment is connected to a first end of the second ground protection line segment, and a second end of the second ground protection line segment is connected to a first end of the third ground protection line segment.

In an exemplary embodiment, as shown in FIG. 12 or 14, the first ground protection line segment is parallel to the first clock signal line segment, the second ground protection line segment is parallel to the second clock signal line segment, and the third ground protection line segment is parallel to the third clock signal line segment.

In an exemplary embodiment, as shown in FIG. 13 or 15, the line widths of the first ground protection line GND1, the second ground protection line GND2, and the third ground protection line GND3 may be equal.

In an exemplary embodiment, as shown in FIG. 13 or 15, a ratio of the line widths (i.e., w2) of the first ground protection line GND1, the second ground protection line GND2 and the third ground protection line GND3 to the line widths (i.e., w1) of the first clock signal line CLK1 and the second clock signal line CLK2 may be about 0.8 to 1.2. For example, the line widths (i.e., w2) of the first ground protection line GND1, the second ground protection line GND2 and the third ground protection line GND3 may be equal to the line widths (i.e., w1) of the first clock signal line CLK1 and the second clock signal line CLK2. Here, the embodiment of the present disclosure is not limited to this.

In an exemplary embodiment of the present disclosure, on one hand, by arranging the ratio of the spacing between two adjacent clock signal lines to the line width of the clock signal lines to be greater than or equal to 3, the wiring structure of the clock signal line may be reasonable. Therefore, when a high-frequency clock signal passes through the clock signal line, induction of a signal on adjacent signal lines may be avoided, the crosstalk of the clock signals may also be avoided, and noise interference generated by mutual coupling of electromagnetic fields in the transmission process of clock signals may be eliminated, thereby improving the electromagnetic compatibility performance. On the other hand, by arranging ground protection lines at gaps on both sides of the clock signal lines, when a high frequency clock signal is transmitted on the clock signal line, a coupled electric field between the lines may be converted into electric field of the respective signal lines to the ground, thereby suppressing crosstalk between the signal lines, reducing the transmission frequency of the signal lines, and effectively improving the electromagnetic compatibility performance. Moreover, by arranging ground protection lines at gaps on both sides of the clock signal lines and digging holes on an upper insulating layer, a ground signal is connected to the upper layer shielding electrode, so that the ground lines on both sides of the clock signal line and the upper shielding electrode build a bridge structure, which shields the clock signal lines with longer periphery, avoids mutual interference between the protection clock signal lines, and avoids electromagnetic interference caused by external systems to the clock signal lines, thereby greatly improving the electromagnetic compatibility performance. In addition, by arranging a dummy trace between two adjacent clock signal lines, the uniformity of the array substrate may be ensured.

Figure 19:
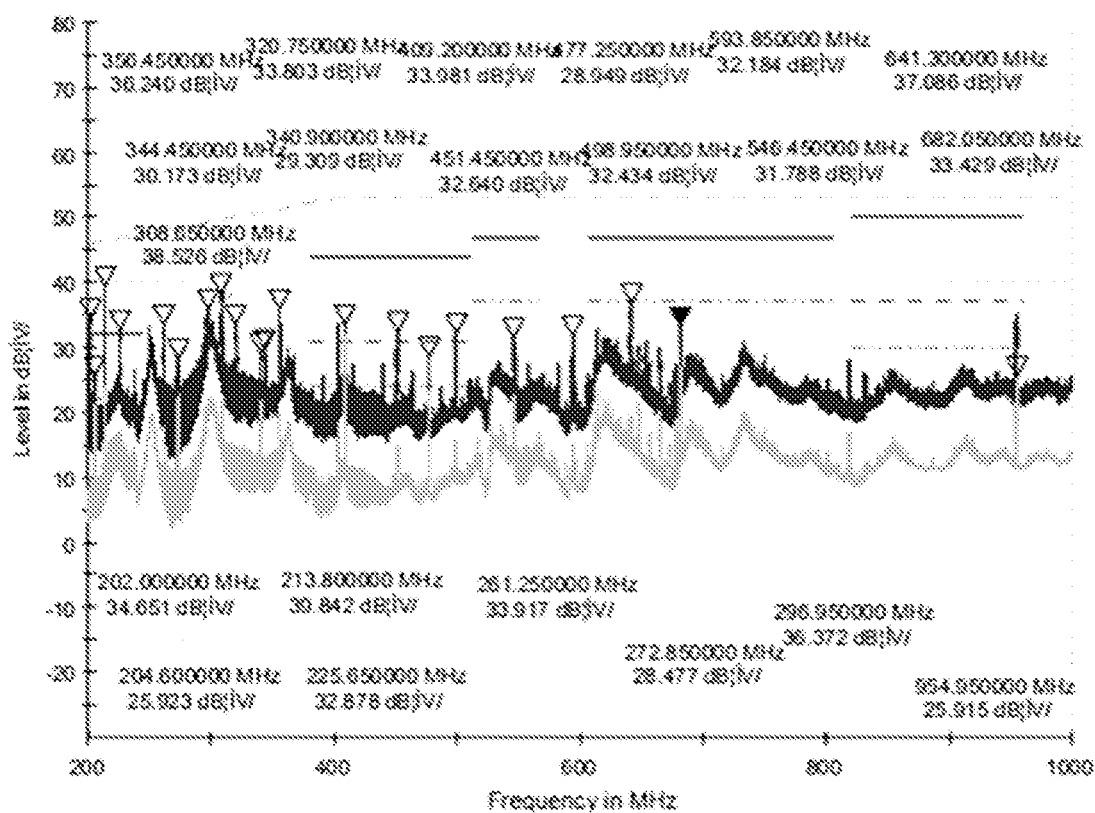
FIG. 19 is a test spectrogram of an array substrate in some techniques.
Figure 20:
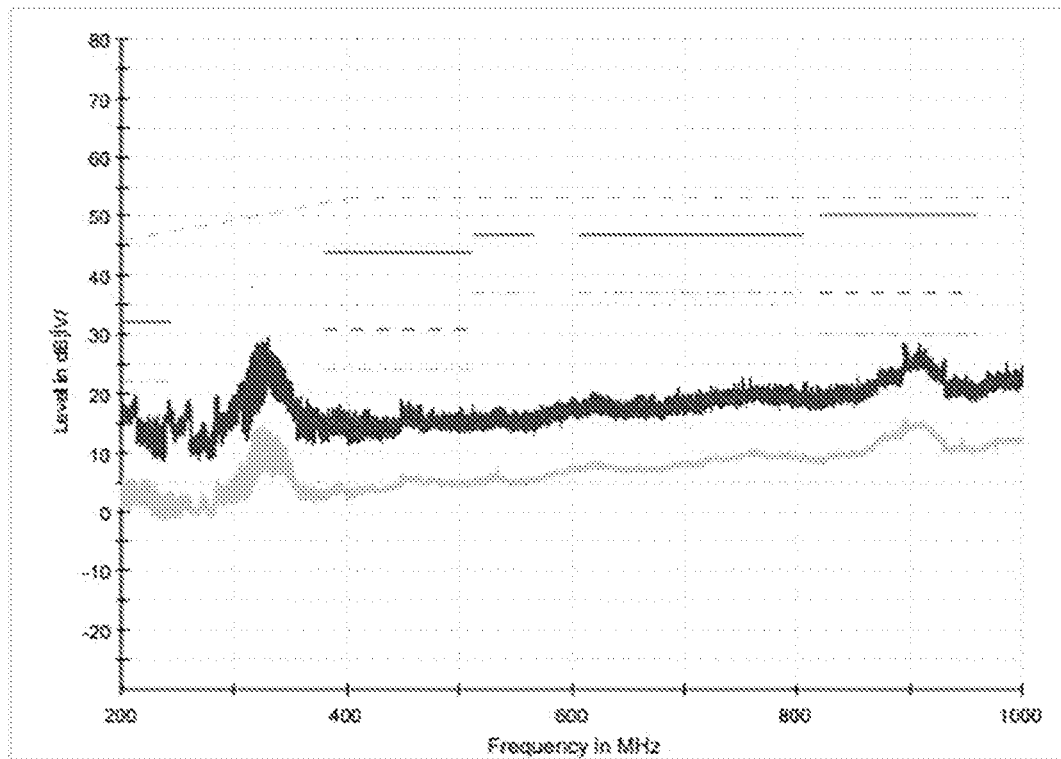
FIG. 20 is a test spectrogram of an array substrate according to an exemplary embodiment of the present disclosure.

According to the simulation experiment, the inventor of the present disclosure obtains a test spectrogram of an array substrate in some techniques as shown in FIG. 19, and a test spectrogram of an array substrate according to an exemplary embodiment of the present disclosure as shown in FIG. 20. According to the experimental results, by arranging the ratio of the spacing between two adjacent clock signal lines to the line width of the clock signal lines to be greater than or equal to 3 in the embodiment of the present disclosure, the wiring structure of the clock signal line may be more reasonable. Therefore, when a high-frequency clock signal passes through the clock signal line, induction of a signal on adjacent signal lines may be avoided, the crosstalk of the clock signals may also be avoided, and noise interference generated by mutual coupling of electromagnetic fields in the transmission process of clock signals may be eliminated, thereby improving the electromagnetic compatibility performance. According to the inventor's test, only by arranging the wiring mode in which the ratio of the spacing between two adjacent clock signal lines to the line width of the clock signal lines is equal to 3, 70% of the crosstalk between signals may be eliminated, thereby effectively improving the electromagnetic compatibility performance of the array substrate. Wiring with larger spacing may eliminate crosstalk between signals to a greater extent, and improve electromagnetic compatibility performance of the array substrate more effectively. Considering the narrow frame requirement of the product, an effective ground protection line may be laid between the high-frequency clock signal lines without increasing the frame, which, as a wiring shielding layer, may reduce the transmission frequency of the signal lines, eliminate crosstalk to a greater extent, and improve the electromagnetic compatibility performance of the array substrate more effectively. Considering the narrow frame requirements of the product, an effective ground protection line may be laid between the high-frequency clock signal lines without increasing the frame, a shielding electrode is arranged, holes are dug in the upper insulating layer of the ground protection line, and the ground signal is connected to the upper shielding electrode, so that the ground lines on both sides of the clock signal line and the upper shielding electrode build a bridge structure, and form a ground plane, which may avoid the formation of a plurality of parallel ground lines, shield the clock signal lines with longer periphery, avoid mutual interference between the clock signal lines, and avoid electromagnetic interference caused by external systems to the clock signal lines, thereby greatly improving electromagnetic compatibility performance without increasing the frame. In addition, when the array substrate in one or more of the above embodiments is applied to a vehicle-mounted display product, since the panel is relatively small, compared with the vehicle-mounted display products with large frame, the peripheral sealing glue cannot cover the GOA unit, which weakens the anti-ESD ability of the product. By adding ground protection lines, the space of the GOA module may be increased, which is easier to be covered by the sealing glue, and it also help improve the ESD ability of the screen.

An embodiment of the present disclosure further provides a display device. The display device may include the array substrate in one or more of the above exemplary embodiments.

In an exemplary embodiment, the display device may include, but is not limited to, an LCD display device or the like, for example, a vehicle-mounted liquid crystal display device. Here, the embodiment of the present disclosure is not limited to this.

In an exemplary embodiment, the array substrate in one or more of the above exemplary embodiments is suitable for use in products such as vehicles. In this way, the electromagnetic compatibility of the vehicle-mounted liquid crystal display device may be improved, and the EMC capability test commonly used in the automobile and electronic industries may be passed in the product certification process, or the vehicle-mounted systems have no electromagnetic interference and normal operation may be ensured during the actual use of the vehicle.

In an exemplary embodiment, taking the display device as a vehicle-mounted liquid crystal display device as an example, when the size of the vehicle-mounted liquid crystal display device is less than 15 inch, an array substrate provided with two clock signal lines may be adopted to realize GOA bilateral driving. Alternatively, when the size of the vehicle-mounted liquid crystal display device is larger than 15 inch, in order to ensure charging, an array substrate with four clock signal lines may be used to realize GOA bilateral driving.

In an exemplary embodiment, the display device may further include a color film substrate arranged opposite the array substrate, and a liquid crystal layer arranged between the array substrate and the color film substrate. For example, the array substrate may include a first structural layer arranged on a side of a first substrate facing the color film substrate, and a second substrate 200 may include a second structural layer arranged on a side of a second substrate facing the array substrate. For example, for ADS display mode, in an exemplary embodiment, the first structural layer may include a clock signal line, a gate line, a data line, a thin film transistor, a pixel electrode, and a common electrode. The first structural layer may further include at least one of a ground protection line, a shielding electrode, and a dummy trace. The second structural layer may include a black matrix and a filter unit. Here, the embodiment of the present disclosure is not limited to this.

In an exemplary embodiment, the display device may include a plurality of pixel units P arranged in a matrix, wherein at least one of the plurality of pixel units P may include a first sub-pixel P1 that emits first-color light, a second sub-pixel P2 that emits second-color light, and a third sub-pixel P3 that emits third-color light. The three sub-pixels each may include a thin film transistor, a pixel electrode and a common electrode. For example, the first sub-pixel P1 may be a red sub-pixel emitting red (R) light, the second sub-pixel P2 may be a green sub-pixel emitting green (G) light, and the third sub-pixel P3 may be a blue sub-pixel emitting blue (B) light. For example, the pixel unit may include four sub-pixels. Here, the embodiment of the present disclosure is not limited to this.

In an exemplary embodiment, the multiple sub-pixels in the pixel unit may be arranged in a manner, such as standing side by side horizontally, standing side by side vertically, an X shape, a cross shape, a shape like a Chinese character "go", or the like. For example, taking a pixel unit including three sub-pixels as an example, the three sub-pixels may be arranged in a manner, such as standing side by side horizontally, standing side by side vertically, a shape like a Chinese character "do", or the like. For example, taking a pixel unit including four sub-pixels as an example, the four sub-pixels may be arranged in a manner, such as standing side by side horizontally, standing side by side vertically, a square shape, or the like. Here, the embodiment of the present disclosure is not limited to this.

In an exemplary embodiment, a shape of a sub-pixel in the pixel unit may be any one or more of a triangle, a square, a rectangle, a rhombus, a trapezoid, a parallelogram, a pentagon, a hexagon, or another polygon. Here, the embodiment of the present disclosure is not limited to this.

In an exemplary embodiment, the display device may include, but is not limited to, any product or component having a display function such as a mobile phone, a tablet computer, a television, a display, a notebook computer, a digital photo bezel, or a navigator. Here, the embodiment of the present disclosure is not limited to this.

The above descriptions of embodiments of the display device are similar to the above descriptions of the embodiments of the array substrate, and the embodiments of the display device have similar beneficial effects as the embodiments of the array substrate. Technical details undisclosed in the embodiments of the display device of the present disclosure may be understood by those skilled in the art with reference to the descriptions in the embodiments of the array substrate of the present disclosure, which will not be repeated here.

Although the implementations of the present disclosure are disclosed above, the above contents are only implementations for easily understanding the present disclosure and not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. An array substrate comprising a display area and a non-display area that at least partially surrounds the display area, wherein the non-display area comprises at least two clock signal lines, a ratio of a spacing between two adjacent clock signal lines to a line width of the clock signal lines is greater than or equal to 3;
   wherein the non-display area further comprises a ground protection line comprising at least one of a first ground protection line arranged on a side of the at least two clock signal lines close to the display area, a second ground protection line arranged between two adjacent clock signal lines, and a third ground protection line arranged on a side of the at least two clock signal lines away from the display area.

2. The array substrate according to claim 1, wherein the ground protection line has the same shape as the clock signal line.

3. The array substrate according to claim 2, wherein
   the ground protection line comprises a first ground protection line segment, a second ground protection line segment and a third ground protection line segment which are sequentially connected;
   the clock signal line comprises a first clock signal line segment, a second clock signal line segment and a third clock signal line segment which are sequentially connected; and
   the first ground protection line segment and the first clock signal line segment both extend in a first direction and are parallel to each other, the second ground protection line segment and the second clock signal line segment both extend in a second direction and are parallel to each other, and the third ground protection line segment and the third clock signal line segment both extend in the first direction and are parallel to each other.

4. The array substrate according to claim 1, wherein the clock signal line and the ground protection line are arranged on the same layer.

5. The array substrate according to claim 4, wherein the display area comprises a plurality of data lines, and the clock signal line and the ground protection line are arranged on the same layer as the data lines.

6. The array substrate according to claim 1, wherein a ratio of a line width of the ground protection line to a line width of the clock signal line is 0.8 to 1.2.

7. The array substrate according to claim 1, wherein line widths of the first ground protection line, the second ground protection line, and the third ground protection line are equal.

8. The array substrate according to claim 1, wherein the non-display area further comprises at least one shielding electrode connected to the ground protection line through a via hole.

9. The array substrate according to claim 8, wherein the display area comprises a common electrode, and the shielding electrode is arranged on the same layer as the common electrode.

10. The array substrate according to claim 8, wherein
    the shielding electrode is arranged on a different layer from the ground protection line and is arranged on a different layer from the clock signal line; and
    an orthographic projection of the shielding electrode on an array substrate plane is at least partially overlapped with an orthographic projection of the ground protection line on the array substrate plane and at least partially overlapped with an orthographic projection of the clock signal line on the array substrate plane.

11. The array substrate according to claim 1, wherein line widths of the at least two clock signal lines are equal.

12. The array substrate according to claim 1, wherein the non-display area further comprises at least one dummy trace arranged between two adjacent clock signal lines.

13. The array substrate according to claim 12, wherein the dummy trace comprises a plurality of dummy trace segments and a discontinuous portion located between two adjacent dummy trace segments.

14. The array substrate according to claim 12, wherein the dummy trace has the same shape as the clock signal line.

15. A display device, comprising the array substrate according to claim 1.

16. The display device according to claim 15, further comprising a color film substrate arranged opposite the array substrate and a liquid crystal layer arranged between the array substrate and the color film substrate.

17. The array substrate according to claim 2, wherein the clock signal line and the ground protection line are arranged on the same layer.

18. The array substrate according to claim 2, wherein a ratio of a line width of the ground protection line to a line width of the clock signal line is 0.8 to 1.2.

19. The array substrate according to claim 2, wherein line widths of the first ground protection line, the second ground protection line, and the third ground protection line are equal.

\* \* \* \* \*